(12) United States Patent
Kuo et al.

(10) Patent No.: US 7,370,616 B2
(45) Date of Patent: May 13, 2008

(54) METHOD FOR TRANSITION BETWEEN CONTROLLED AUTO-IGNITION AND SPARK IGNITION MODES IN DIRECT FUEL INJECTION ENGINES

(75) Inventors: Tang-Wei Kuo, Troy, MI (US);
Zongxuan Sun, Troy, MI (US);
Jun-Mo Kang, Ann Arbor, MI (US);
James A. Eng, Troy, MI (US);
Chen-Fang Chang, Troy, MI (US);
Barry L. Brown, Lake Orion, MI (US);
Paul M. Najt, Bloomfield Hills, MI (US); Man-Feng Chang, Troy, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/367,045

(22) Filed: Mar. 2, 2006

(65) Prior Publication Data
US 2006/0196466 A1 Sep. 7, 2006

Related U.S. Application Data

(60) Provisional application No. 60/658,294, filed on Mar. 3, 2005.

(51) Int. Cl.
*F02B 17/00* (2006.01)
*F02B 5/00* (2006.01)
*F02M 25/07* (2006.01)
*F01L 1/34* (2006.01)

(52) U.S. Cl. .............................. 123/90.15; 123/568.14
(58) Field of Classification Search ........ 123/345–348, 123/90.11, 90.15, 90.16, 90.17, 568.11, 568.14, 123/399, 443, 295, 305
See application file for complete search history.

(56) References Cited

U.S. PATENT DOCUMENTS 4,446,830 A 5/1984 Simko et al.

(Continued)

FOREIGN PATENT DOCUMENTS

WO WO 01/46571 6/2001

(Continued)

OTHER PUBLICATIONS

SAE Tech Paper Series #980495, "Fuel Injection Strategies to Increase Full-Load Torque Output of a Direct-Injection SI Engine", Yang and Anderson; Feb. 23-26, 1998.

(Continued)

*Primary Examiner*—Hai Huynh

(57) ABSTRACT

A method is provided for control of transition between combustion modes of a direct-injection engine operable in a homogeneous charge compression ignition (HCCI) mode at lower loads and a spark ignition flame propagation (SI) mode at higher loads. The engine includes a variable valve actuation system including two-step high and low lift valve actuation and separate cam phasing for both intake and exhaust valves. The method includes operating the engine at steady state, with fuel-air-exhaust gas mixtures at predetermined conditions, for each speed and load, and controlling the engine during mode changes between the HCCI mode and the SI mode by switching the exhaust and intake valves between low lift for HCCI operation and high lift for SI operation. High load may be an SI throttled mode with an intermediate unthrottled mode (SI/NTLC} in which transition between HCCI and SI/NTLC modes requires switching only the exhaust valve lift and transition between SI/NTLC and SI throttled modes requires switching only the intake valve lift, with predetermined phase adjustments in the valve timing phasing.

13 Claims, 24 Drawing Sheets

U.S. PATENT DOCUMENTS

| | | |
|---|---|---|
| 5,713,328 A | 2/1998 | Anderson et al. |
| 5,746,182 A | 5/1998 | Nada |
| 6,082,342 A | 7/2000 | Duret et al. |
| 6,155,217 A | 12/2000 | Shiraishi et al. |
| 6,267,097 B1 * | 7/2001 | Urushihara et al. ......... 123/305 |
| 6,286,478 B1 | 9/2001 | Atago et al. |
| 6,336,436 B1 | 1/2002 | Miyakubo et al. |
| 6,386,177 B2 | 5/2002 | Urushihara et al. |
| 6,497,213 B2 | 12/2002 | Yoshizawa et al. |
| 6,619,255 B2 | 9/2003 | Urushihara et al. |
| 6,622,689 B2 * | 9/2003 | Hasegawa et al. .......... 123/294 |
| 6,636,197 B1 | 10/2003 | Goldenberg et al. |
| 6,640,771 B2 * | 11/2003 | Fuerhapter ................. 123/295 |
| 6,651,616 B1 | 11/2003 | Juretzka et al. ............. 123/305 |
| 6,807,937 B2 * | 10/2004 | Gianolio et al. ............ 123/308 |
| 6,895,912 B2 * | 5/2005 | Saruwatari et al. ...... 123/90.15 |
| 7,004,116 B2 * | 2/2006 | Allen ....................... 123/27 R |
| 7,017,561 B1 | 3/2006 | Liu et al. ............... 123/568.12 |
| 7,021,277 B2 * | 4/2006 | Kuo et al. .................. 123/299 |
| 7,089,912 B2 | 8/2006 | Koopmans ............. 123/406.45 |
| 7,128,047 B2 | 10/2006 | Kuo et al. .................. 123/299 |
| 7,171,957 B2 | 2/2007 | Liu et al. ............... 123/568.12 |
| 7,194,996 B2 | 3/2007 | Koopmans ................. 123/295 |
| 2004/0134449 A1 | 7/2004 | Yang |
| 2004/0173180 A1 | 9/2004 | Strom et al. |
| 2004/0182359 A1 | 9/2004 | Stewart et al. |
| 2006/0016421 A1 | 1/2006 | Kuo et al. |
| 2006/0016422 A1 | 1/2006 | Kuo et al. |
| 2006/0016423 A1 | 1/2006 | Kuo et al. |
| 2006/0196466 A1 | 9/2006 | Kuo et al. .................. 123/295 |
| 2006/0196467 A1 | 9/2006 | Kang et al. ................. 123/305 |
| 2006/0196468 A1 | 9/2006 | Chang et al. ............... 123/305 |
| 2006/0196469 A1 | 9/2006 | Kuo et al. .................. 123/305 |
| 2006/0243241 A1 * | 11/2006 | Kuo et al. .................. 123/295 |

FOREIGN PATENT DOCUMENTS

| | | |
|---|---|---|
| WO | WO 01/46572 | 6/2001 |
| WO | WO 01/46573 | 6/2001 |

OTHER PUBLICATIONS

U.S. Appl. No. 11/366,217, filed Mar. 2, 2006, Kang et al.
U.S. Appl. No. 11/367,050, filed Mar. 2, 2006, Kuo et al.
U.S. Appl. No. 11/367,047, filed Mar. 2, 2006, Chang et al.

* cited by examiner

HCCI Mode

B — 1000 rpm
Split Injection
C1 — $EOI_1$ = 330°bTDC
A1 — $Mass_1$ = 7 mg
C2 — $EOI_2$ = 280°bTDC
A2 — $Mass_2$ = 8 mg
D — Spark = 20°bTDC
E — NVO = 112 deg
F — IMEP = 465 kPa
G — A/F = 15
H — EGR Valve 6.5% Open
I — Throttle Valve 20% Open
J — Intake $O_2$ Percent
K — Exhaust Gas Temperature
L — LPP
M — Max. Rate of Pressure Rise

*FIG. 9A*

SI Mode 1000 rpm
Split Injection
$EOI_1$ = 310°bTDC
$Mass_1$ = 9 mg
$EOI_2$ = 240°bTDC
$Mass_2$ = 6 mg
Spark = 25°bTDC
NVO = -36 deg
IMEP = 452 kPa
A/F = 15
EGR Valve 0% Open
Throttle Valve 100% Open

*FIG. 9B*

SI => HCCI:
71 — Case 1: NVO and EGR complete change in 8 cycles
72 — Case 2: NVO and EGR complete change in 12 cycles
73 — Case 3: NVO and EGR complete change in 16 cycles

HCCI => SI:
74 — Case 4: NVO and EGR complete change in 8 cycles
75 — Case 5: NVO and EGR complete change in 12 cycles
76 — Case 6: NVO and EGR complete change in 16 cycles

*FIG. 10*

METHOD FOR TRANSITION BETWEEN CONTROLLED AUTO-IGNITION AND SPARK IGNITION MODES IN DIRECT FUEL INJECTION ENGINES

CROSS-REFERENCE TO RELATED APPLICATIONS

This application claims priority from U.S. Provisional Patent Application No. 60/658,294 filed Mar. 3, 2005.

TECHNICAL FIELD

This invention relates to a method for robust transition between controlled auto-ignition and spark-ignition flame propagation combustion in gasoline direct-injection engines.

BACKGROUND OF THE INVENTION

To improve thermal efficiency of gasoline internal combustion engines, dilute combustion—using either air or re-circulated exhaust gas—is known to give enhanced thermal efficiency and low NOx emissions. However, there is a limit at which an engine can be operated with a diluted mixture because of misfire and combustion instability as a result of a slow burn. Known methods to extend the dilution limit include 1) improving ignitability of the mixture by enhancing ignition and fuel preparation, 2) increasing the flame speed by introducing charge motion and turbulence, and 3) operating the engine under controlled auto-ignition combustion.

The controlled auto-ignition process is sometimes called the Homogeneous Charge Compression Ignition (HCCI) process. In this process, a mixture of combusted gases, air and fuel is created and auto-ignition is initiated simultaneously from many ignition sites within the mixture during compression, resulting in very stable power output and high thermal efficiency. Since the combustion is highly diluted and uniformly distributed throughout the charge, the burned gas temperature, and hence NOx emission, is substantially lower than that of the traditional spark ignition engine based on propagating flame front, and the diesel engine based on an attached diffusion flame. In both spark ignition and diesel engines, the burned gas temperature is highly heterogeneous within the mixture with very high local temperature creating high NOx emissions.

Engines operating under controlled auto-ignition combustion have been successfully demonstrated in two-stroke gasoline engines using a conventional compression ratio. It is believed that the high proportion of burned gases remaining from the previous cycle, i.e. the residual content, within the two-stroke engine combustion chamber is responsible for providing the high mixture temperature necessary to promote auto-ignition in a highly diluted mixture. In four-stroke engines with traditional valve means, the residual content is low, controlled auto-ignition at part load is difficult to achieve. Known methods to induce controlled auto-ignition at part load include: 1) intake air heating, 2) variable compression ratio, and 3) blending gasoline with fuel that has wider auto-ignition ranges than gasoline. In all the above methods, the range of engine speeds and loads in which controlled auto-ignition combustion can be achieved is relatively narrow.

Engines operating under controlled auto-ignition combustion have been demonstrated in four-stroke gasoline engines using variable valve actuation to obtain the necessary conditions for auto-ignition in a highly diluted mixture. Various fueling controls including split and single injections have been proposed for use in conjunction with valve control strategies to maintain stable auto-ignition combustion across a variety of engine load conditions.

In commonly assigned U.S. patent application Ser. No. 10/899,457 an exemplary fuel injection and valve strategy for stable, extended controlled auto-ignition is disclosed. Therein, during operation with low part load, a first injection of fixed amount of fuel during the negative valve overlap period is followed by a second fuel injection during the subsequent compression stroke. The injection timing for the first injection retards and the injection timing for the second injection advances in a continuous manner as the engine load increases. During operation with intermediate part load, a first injection of fuel during the negative valve overlap period followed immediately by a second injection of fuel during the subsequent intake stroke supports auto-ignition. Optimal separation of the two injections is around 30 to 60 degrees crank angle. The injection timings of both injections retard in a continuous manner as the engine load increases. And, during operation with high part load, a single fuel injection during the intake stroke supports auto-ignition. The injection timing retards as the engine load increases.

Lean air-fuel ratio operation is the preferred mode from low load to high part loads for best fuel economy. However, as the engine load or fueling rate increases, the engine-out NOx emission also increases. Above a certain engine load, the level of NOx emission can exceed a limiting value. The NOx aftertreatment conversion efficiency reduces drastically if a traditional three-way after treatment device is used with lean engine operation. A switch from lean to stoichiometric engine operation is therefore necessitated at some point as load increases such that the traditional three-way after treatment device can be used for effective NOx emission control.

Further extension of the mid load operation limit of a gasoline direct-injection controlled auto-ignition combustion engine that is capable of using a conventional three-way after-treatment system as an emission control device can be achieved by employing a fuel injector with multiple injection capability and a spark plug. A first fuel injection occurs during early intake stroke to form a lean air-fuel mixture throughout the combustion chamber near the end of the compression stroke. A second fuel injection occurs in either the later part of the intake stroke or the compression stroke to create a stratified air-fuel mixture with ignitable mixture near the spark plug. The spark plug is used to ignite the ignitable mixture and its timing strongly influences the combustion phasing. The spark-ignition combustion works as an ignition source to trigger the auto-ignition of the surrounding lean mixture to burn at a target crank angle after TDC of the compression stroke. In this way, a mixed-mode combustion process that consists of two separate yet related processes is realized. Further, the engine is operated at the stoichiometric air fuel ratio with external EGR dilution so a traditional after-treatment device is sufficient for engine-out emission control. The external EGR dilution also acts as an effective combustion rate control parameter during the auto-ignition combustion phase. The high load limit of a gasoline direct-injection controlled auto-ignition combustion engine is expanded by more than 10% with acceptable maximum rate of pressure rise or amplitude of pressure oscillation.

While the advances outlined above have successfully demonstrated controlled auto-ignition capabilities at steady state conditions, rapid load changes or transients may introduce undesirable combustion results. Commonly assigned and co-pending U.S. patent application Ser. No. 11/366,217 describes a system and method for robust auto-ignition combustion control during load transients between low load and high part load. For engine operations with lean air-fuel ratio without external EGR, feed forward control with lookup tables and rate limiters is sufficient to ensure no misfiring and partial-burn during low load to high part load (and vice versa) transitions. However, load transitions between high part load and medium load benefit from feedback control to adequately address misfiring or partial-burns. Commonly assigned and co-pending U.S. patent application Ser. No. 11/367,050 describes a system and method for robust auto-ignition combustion control during load transients between high part load and medium load.

With all the attempts in expanding the range of engine operation with controlled auto-ignition as described above, a limit is reached beyond which controlled auto-ignition combustion is not possible. In order to operate the engine throughout the needed speed and load ranges, traditional SI engine operation is needed. Smooth transitions between controlled auto-ignition and traditional SI combustion is therefore required.

SUMMARY OF THE INVENTION

The present invention relates to a method for transition between controlled auto-ignition (HCCI) combustion and flame propagation combustion (SI) in direct-injection engines fueled by gasoline or other similar fuels. The method uses a combination of feed forward control with look-up tables including fuel injection, variable valve actuation timing and lift, spark timing, and throttle and EGR valve positions coupled with feedback control using valve actuation, throttle and EGR valve positions. In addition, methods for precise air-fuel ratio control during mode transition are proposed in order to eliminate misfiring and partial burns.

A feed forward control may be provided with which inputs to the engine, including spark timing, fuel injection timing, and valve timing, are continually set equal to steady state inputs corresponding to the current fueling rate. Pre-calibrated steady state inputs are stored in lookup tables, and inputs to the engine are determined by interpolating values of steady state inputs in the lookup tables based on the current fueling rate. Rate limiters are used to compensate different dynamics in the system, such as by controlling the rates of air and fuel delivery to synchronize with the desired transients.

A feedback control may be provided to adjust the outputs of the feed forward control to more closely match the desired input settings for optimum performance.

These and other features and advantages of the invention will be more fully understood from the following description of certain specific embodiments of the invention taken together with the accompanying drawings.

BRIEF DESCRIPTION OF THE DRAWINGS

FIGS. 9A & B are charts listing steady state operating conditions for HCCI/Stoich. and SI/NTLC modes before and after transition;

FIG. 10 is a chart listing test cases 1-6;

DESCRIPTION OF THE PREFERRED EMBODIMENT

For simplicity, the following descriptions will address the present invention in its application to a single cylinder direct-injection gasoline four-stroke internal combustion engine, although it should be appreciated that the present invention is equally applicable to a multi-cylinder direct-injection gasoline four-stroke internal combustion engines.

A four-stroke, single cylinder, 0.55 liter, internal combustion engine was utilized in implementing the various controls and acquisition of the various data embodied herein. Unless specifically discussed otherwise, all such implementations and acquisitions are assumed to be carried out under standard conditions as understood by one having ordinary skill in the art. The present invention is described in its application to a two valves per cylinder engine (one intake and one exhaust valve), although it should be appreciated that the present invention is equally applicable to a multi-valve per cylinder engine. And, although the present invention is applicable to any variable valve actuation (VVA) strategy using either a fully flexible electro-hydraulic or an electro-mechanical system, the example used below to illustrate our control strategy is based on a two-step with dual cam phasing VVA system.

Figure 1:
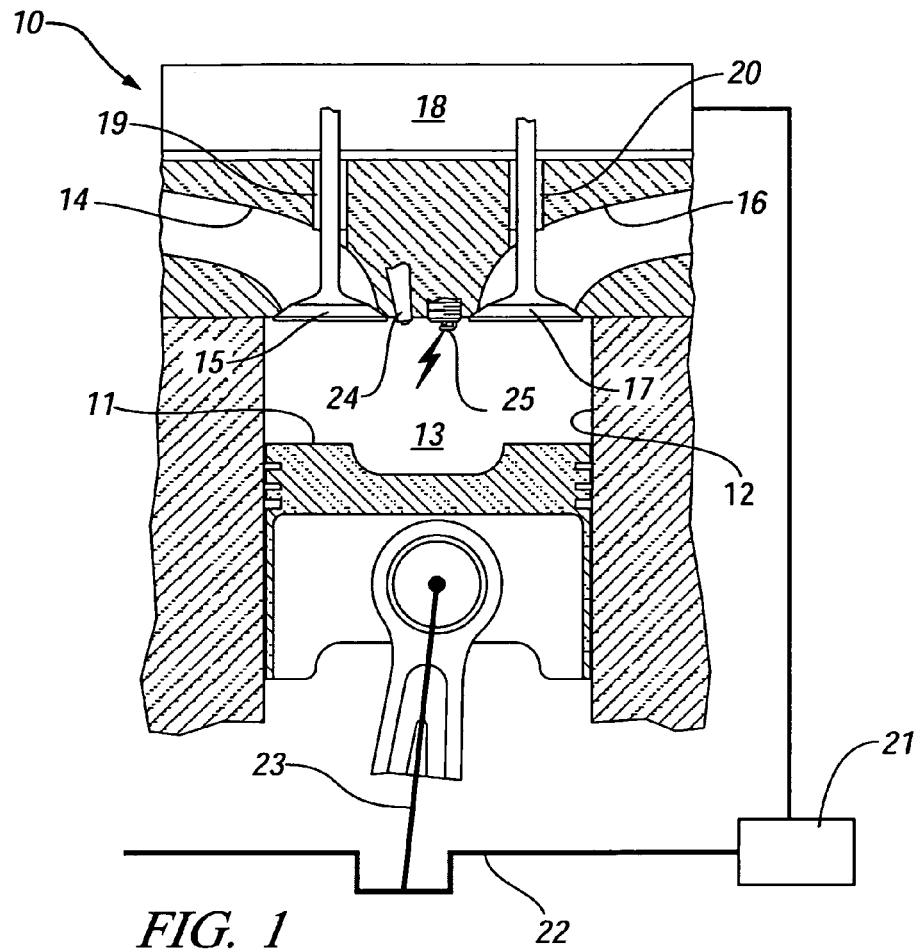
FIG. 1 is a schematic illustration of a single cylinder gasoline direct-injection four-stroke internal combustion engine capable of being operated according to the present invention.

Referring first to FIG. 1 of the drawings in detail, numeral 10 generally indicates a schematic representation of an exemplary single-cylinder direct-injection four-stroke internal combustion engine. In the figure, a piston 11 is movable in a cylinder 12 and defines with the cylinder 12 a variable volume combustion chamber 13. An intake passage 14 supplies air into the combustion chamber 13. Air flow into the combustion chamber 13 is controlled by an intake valve 15. Combusted gases can flow from the combustion chamber 13 via an exhaust passage 16, controlled by an exhaust valve 17.

Exemplary engine 10 has a hydraulically controlled valve train with an electronic controller 18, which is programmable and hydraulically controls the opening and closing of both the intake 15 and exhaust 17 valves. The electronic controller 18 will control the movement of the intake valve 15 and exhaust valve 17 having regard to the positions of the intake and exhaust valves 15 and 17 as measured by two position transducers 19 and 20. The controller 18 will also refer to the angular position of the engine, as indicated by a rotation sensor 21 connected to the engine crankshaft 22. The crankshaft 22 is connected by a connecting rod 23 to the piston 11 reciprocating in the cylinder 12. A gasoline direct injector 24, controlled by the electronic controller 18, is used to inject fuel directly into the combustion chamber 13. The various functions ascribed to the controller 18 may equally well be performed by a plurality of separate but coordinated controllers adapted for the various tasks.

A spark plug 25, controlled also by the electronic controller 18, is used to enhance the ignition timing control of the engine at certain conditions (e.g. during cold start and near the low load operation limit). Also, it has proven preferable to rely on spark ignition near the high part-load operation limit under controlled auto-ignition combustion and during high speed/load operating conditions with throttled or non-throttled SI operation.

Figure 2:
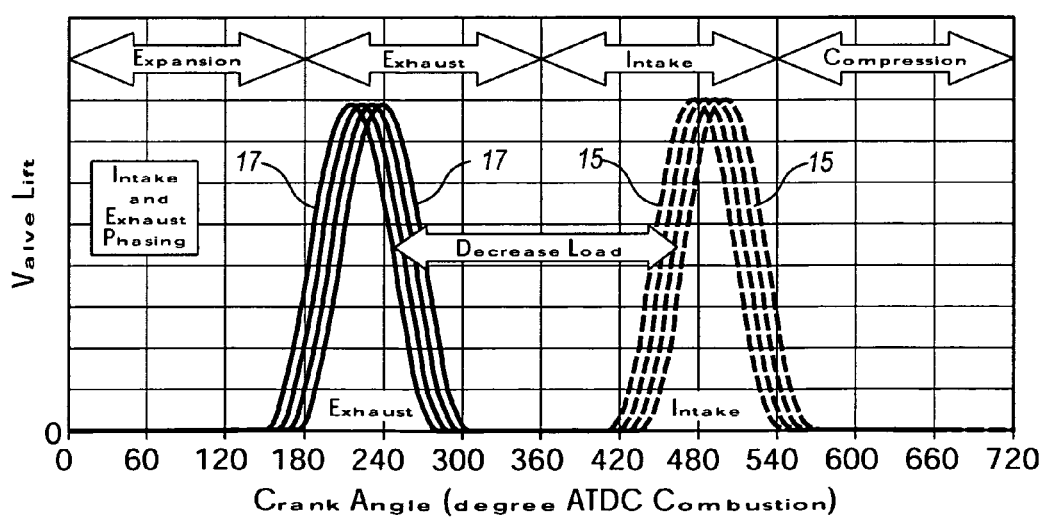
FIG. 2 is a graph of valve lift vs. crank angle for the phasing of exhaust and intake valves of a four-stroke internal combustion engine operating at different loads according to exemplary controlled auto-ignition control using two-step variable valve actuation with dual cam phasing.

FIG. 2 illustrates the control motions of the intake valve 15 and exhaust valve 17 wherein the valve lift profiles are shown as a function of crank angle for the exhaust 17 and intake 15 valves of the four-stroke internal combustion engine operating with exemplary controlled auto-ignition (HCCI combustion) controls.

Motion of the exhaust valve is shown by the solid lines 17 and motion of the intake valve is indicated by the dashed lines 15. The exhaust valve 17 closes early, at a variable angle before the exhaust/intake top dead center (TDC 360 degrees) and the intake valve 15 opens late, preferably at an equal angle after TDC. The interim period when both valves are closed is referred to as negative valve overlap (NVO). The paired exhaust/intake valve profiles 17, 15, ranging from the pair closest together to the pair furthest apart represent increasing NVO with decreasing engine loads (NMEP) of, sequentially, 350, 285, 215 and 144 kPa. This valve motion can be achieved using a dual cam phasing system, or by any other devices that can generate such valve profiles.

With this strategy, the negative valve overlap (NVO) is varied by phasing of both intake and exhaust lift profiles simultaneously. It is experimentally confirmed that for maintaining optimal auto-ignition combustion throughout the load range, the required negative valve overlap period increases linearly with decreasing engine load, which relationship is illustrated in FIG. 2.

Figure 3A:
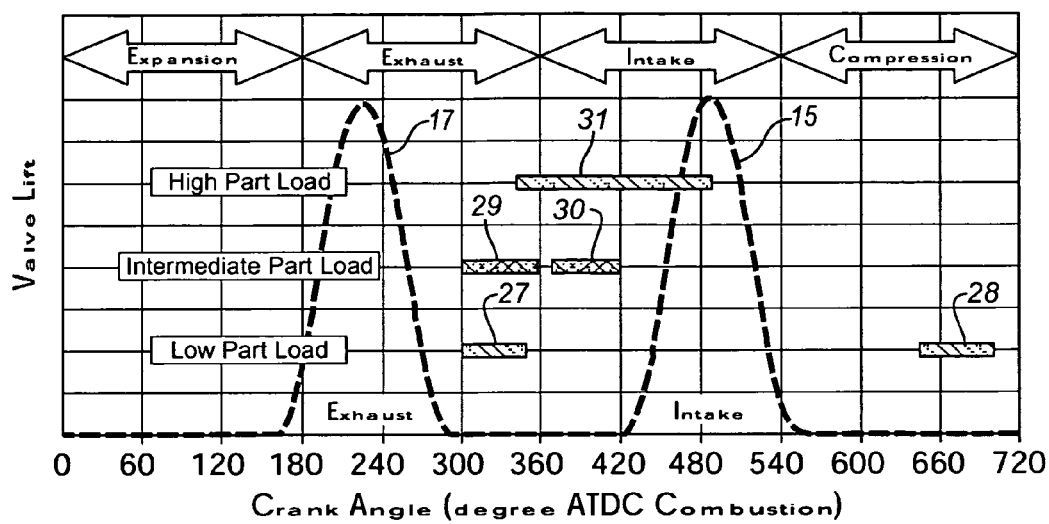
FIG. 3A is a graph of typical intake and exhaust valve events vs. crank angle with exemplary controlled auto-ignition injection strategies for engine operation with low, intermediate, and high part loads, respectively.

FIG. 3A shows exemplary injection strategies during engine operation with low, intermediate, and high part loads, respectively. Also shown in FIG. 3A are exemplary intake and exhaust valve events and, in FIG. 3B is shown in-cylinder pressure history in accordance with such exemplary valve events.

During operation with low part load, the fuel injector is injected twice during a single engine cycle as indicated by spaced bars 27, 28. The first injection 27, between about 300 and 350 degrees ATDC combustion, sprays a fixed amount of gasoline or equivalent fuel into the high temperature and pressure exhaust gas trapped in the cylinder during the negative valve overlap period. The injection timing for the first injection is retarded in a continuous manner as the engine load increases. The fuel is partially oxidized and converted to more reactive chemical species and energy is released. The amount of the more reactive chemical species and energy varies with the quantity and timing of fuel injected in the first injection and the negative valve overlap (NVO) period.

Figure 3B:
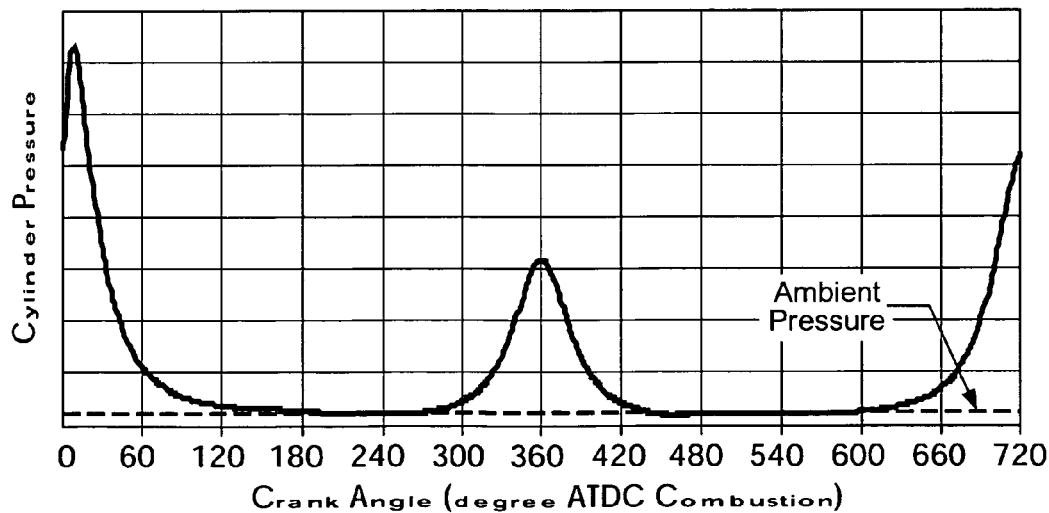
FIG. 3B is a graph of a typical in-cylinder pressure history vs. crank angle for exemplary controlled auto-ignition exhaust recompression valve strategy.

As shown in FIG. 3B, the trapped gases are first compressed in the NVO period toward the end of the exhaust stroke between about 300 and 360 degrees ATDC, after the exhaust valve closes. The compressed fuel and exhaust gas mixture is then expanded during the early part of the intake stroke when both the intake and exhaust valves are closed. The cylinder pressure drops to around the ambient pressure at which time the intake valve opens to induct fresh air into the combustion chamber. During the compression stroke, the fuel injector is activated again at 28 for a second injection of gasoline into the combustion chamber between 60 and 20 degrees BTDC combustion. This injection timing is chosen to ensure smoke-free operation and is affected by either the injector spray cone angle or the amount of fuel injected.

The injection timing for the second injection is advanced in a continuous manner as the engine load increases. Penetration and dispersion of the fuel spray are suppressed due to higher in-cylinder charge temperature and density. A localized rich mixture region is formed in the combustion chamber. The species formed by gasoline reforming after the first fuel injection works in conjunction with the localized rich mixture formed by the second fuel injection to accomplish the auto-ignition of gasoline under a relatively low compression ratio without any help of spark, as compared to a relatively high compression ratio used in a diesel engine.

During operation with intermediate part load, the fuel injector is also activated twice during a single engine cycle as shown by adjacent bars 29, 30. The first injection 29 sprays gasoline into the combustion chamber between about 300 and 360 degrees ATDC combustion, similar to that used in the operation with low part load. The second injection 30, however, starts about 30 to 60 degrees after the end of the first injection. Both injections are performed during the negative valve overlap period or the early portion of the intake stroke. The injection timings of both injections are retarded in a continuous manner as the engine load increases. The objective is to use split injection for controlling gasoline reform, and thus the auto-ignition process. For both low and intermediate part load operations, 1-3 mg of fuel is sufficient for the first injection 29. The remaining fuel is injected during the second injection 30.

During operation with high part load, the fuel injector is activated only once during a single engine cycle, as shown by bar 31. The injection timing varies between 340 and 490 degrees ATDC combustion depending on the engine load. The injection timing is retarded as the engine load increases.

Transition from one injection strategy to another during load change is regulated to maintain optimal engine performance and emissions. For example, during operation with low part load, split injection—with the first injection 27 during the negative valve overlap period and the second injection 28 during the compression stroke—is the only injection strategy that has proved capable of generating stable controlled auto-ignition combustion. The injection timing for the second injection 28 is advanced continuously with increasing engine load to promote dispersion of fuel within the cylinder content and to keep the air/fuel ratio of the localized mixture within an acceptable range to avoid excessive emissions of NOx and smoke.

However, even with the advanced injection timing, formation of nitrogen oxides (NOx) can still rise to unacceptable levels during operation at intermediate part load. Thus, with intermediate part load, the injection timing of the second fuel injection 30 is switched from the compression stroke to the intake stroke as shown in FIG. 3A. It is confirmed experimentally that both strategies result in similar engine performance. Although the NOx emission can be greatly reduced with the second fuel injection 30 during the intake stroke, the HC emission increases due to an increase in the fuel trapped in the crevice that escapes combustion. The exact load where the transition takes place will be determined by emissions tradeoff.

Figure 4:
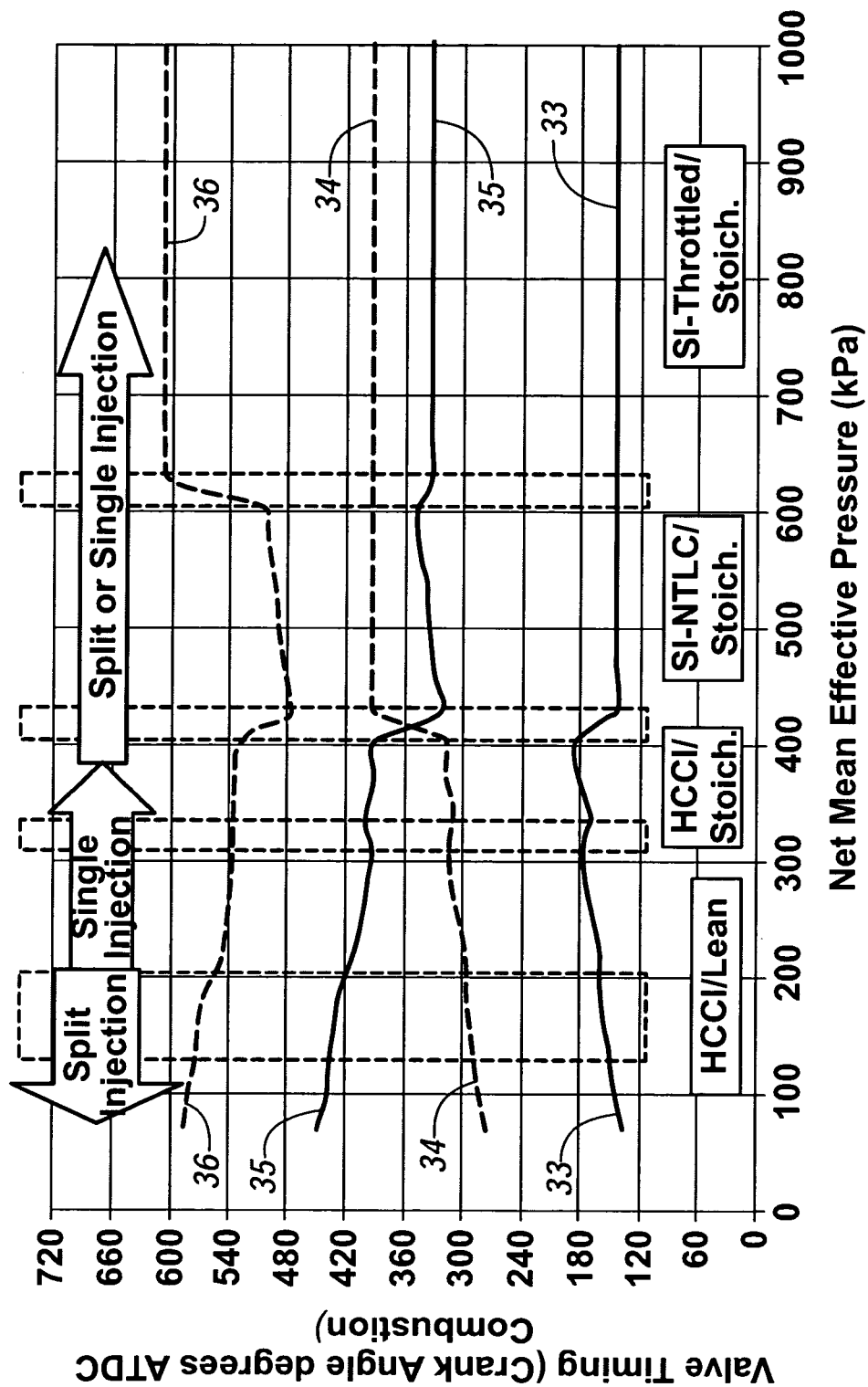
FIG. 4 is a graph of exemplary overall operating strategy vs. engine load for exhaust and intake valves, fuel injection and operation mode for a single cylinder four-stroke internal combustion engine operating according to exemplary controlled auto-ignition controls using a two-step with dual cam phasing variable valve actuation system.

FIG. 4 shows exemplary opening and closing valve timings as a function of engine load for the exhaust and intake valves of a single cylinder four-stroke internal combustion engine operating at a constant speed. The valve control exemplifies exhaust recompression using a two-step with dual cam phasing VVA system. Exhaust valve openings over the load range (NMEP) are shown by a solid line 33 and exhaust valve closings by a dashed line 34. Intake valve openings are shown by a solid line 35 and intake valve closings by a dashed line 36. Also shown in FIG. 4 are the injection strategy (split vs. single) and various combustion modes as a function of engine load at an exemplary constant speed.

In particular, the engine is operated in the controlled auto-ignition combustion mode with lean air/fuel mixture (HCCI/Lean) below 320 kPa NMEP. During this combustion mode, the NOx emission index increases with increasing engine load. At 320 kPa NMEP, the NOx emission index is around 1 g/kg fuel. Accordingly, between 320 and 400 kPa NMEP, the engine is operated in the controlled auto-ignition combustion mode with stoichiometric air/fuel ratio (HCCI/Stoich.) to allow the use of a traditional after treatment device for NOx control. Split injection may be used in the higher load portion of this mode to limit the maximum rate of cylinder pressure rise.

Between 400 and 600 kPa NMEP, the engine is operated in a spark-ignition, non-throttled stoichiometric mode with load controlled by VVA strategies such as early intake valve closing (SI-NTLC/Stoich, as shown) or late intake valve closing. Beyond 600 kPa NMEP, the engine is operated in a traditional spark-ignition with stoichiometric air/fuel mixture (SI-Throttled/Stoich) until reaching full load. Split injection may be utilized in either of the latter two modes in order to limit the maximum rate of cylinder pressure rise.

It should be pointed out that the calibration values in FIG. 4 are essentially the values for 1000 rpm in the lookup table of FIG. 6, to be subsequently discussed. For different engine speeds, similar operating strategies in fuel injection, valve timing, and combustion to those shown in FIG. 4 are observed experimentally with differences only in the exact NMEP values where various transitions should take place. In general, the NMEP values reported in FIG. 4 for the various transitions decrease with increasing engine speed. In particular, the high load operating limit decreases with increasing engine speed due to less engine heat loss. Thus, the range of controlled auto-ignition combustion also decreases with increasing engine speed.

In a controlled auto-ignition engine, combustion phasing is strongly affected by charge temperature, e.g., higher charge temperatures advance combustion phasing and may result in knocking, while lower charge temperatures retard combustion phasing and may result in partial-burn or misfire. The method uses a combination of feed forward control with look-up tables and rate limiters, including fuel injection timing (FI), variable valve actuation, spark timing (SI), throttle valve and EGR valve positions in conjunction with feedback control using variable valve actuation, throttle and EGR valve positions, In addition, methods for precise air-fuel ratio control during mode transition are proposed to eliminate misfiring and partial burns.

Figure 5:
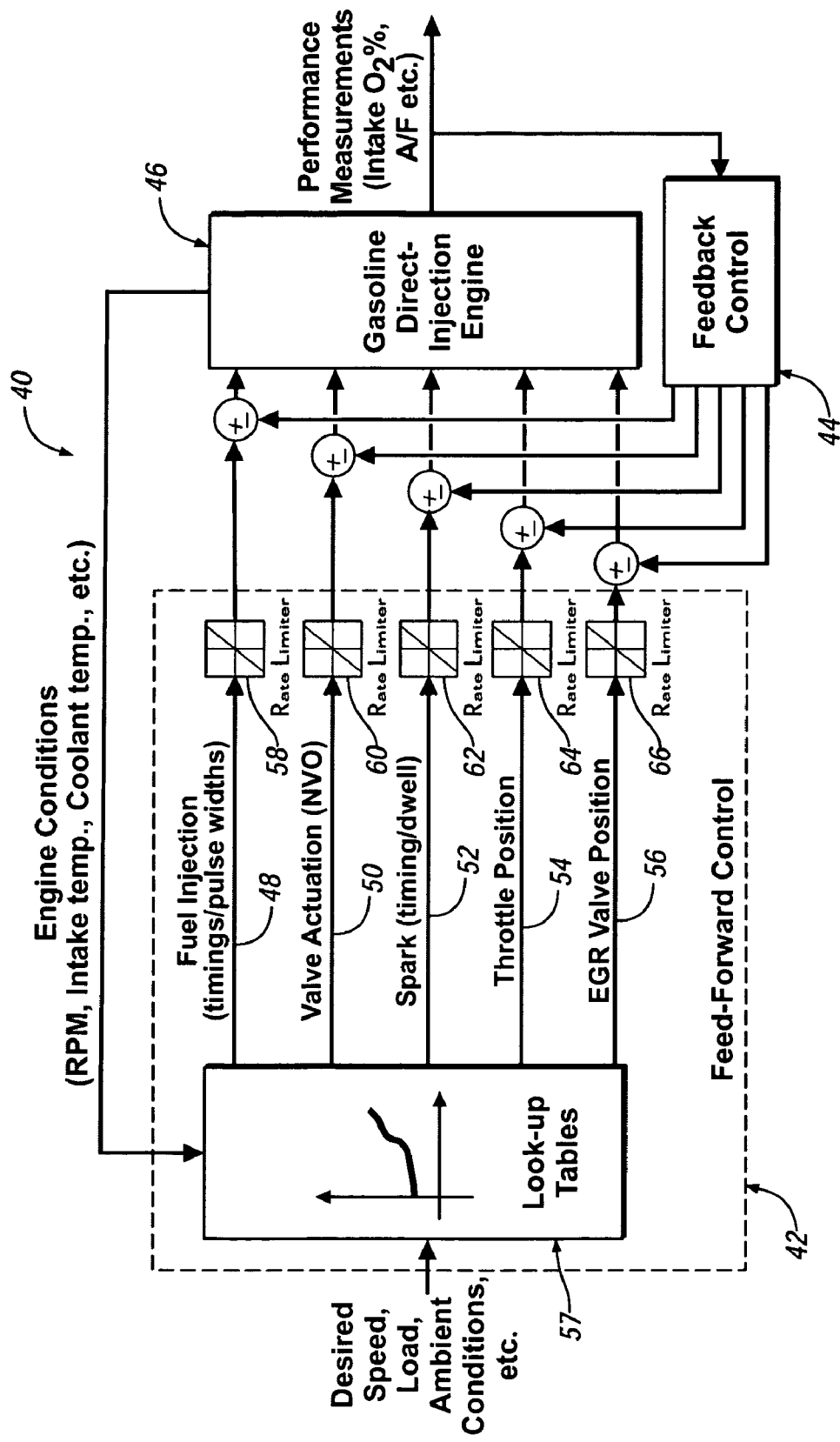
FIG. 5 is a diagrammatic view of an exemplary controller with which robust controlled auto-ignition combustion is maintained during various load transients in accordance with the present invention.

FIG. 5 shows a schematic diagram of an engine controller 40, according to the invention, with which robust combustion is achieved during mode transitions between SI and HCCI. The controller 40 includes a feed forward control 42 and a feedback control 44, connected with associated components of a representative gasoline direct-injection engine 46.

The feed forward control 42 is crucial to achieve a fast system response and it includes two major elements, lookup tables and rate limiters. Based on the desired load and engine operating conditions, required fuel injection timings (FI) and pulse widths (fueling rate) 48, valve actuation (including negative valve overlap, NVO) 50 spark timing (SI) 52, throttle position 54, and EGR valve position 56 are calculated from the lookup tables 57 to control the combustion phasing. Also, depending on the current engine operating conditions and driver's load demand, variable rate limiters 58, 60, 62, 64, 66 are used to compensate different dynamics in the system, e.g., air, fuel and EGR dynamics, as will be discussed later in detail.

Figure 6:
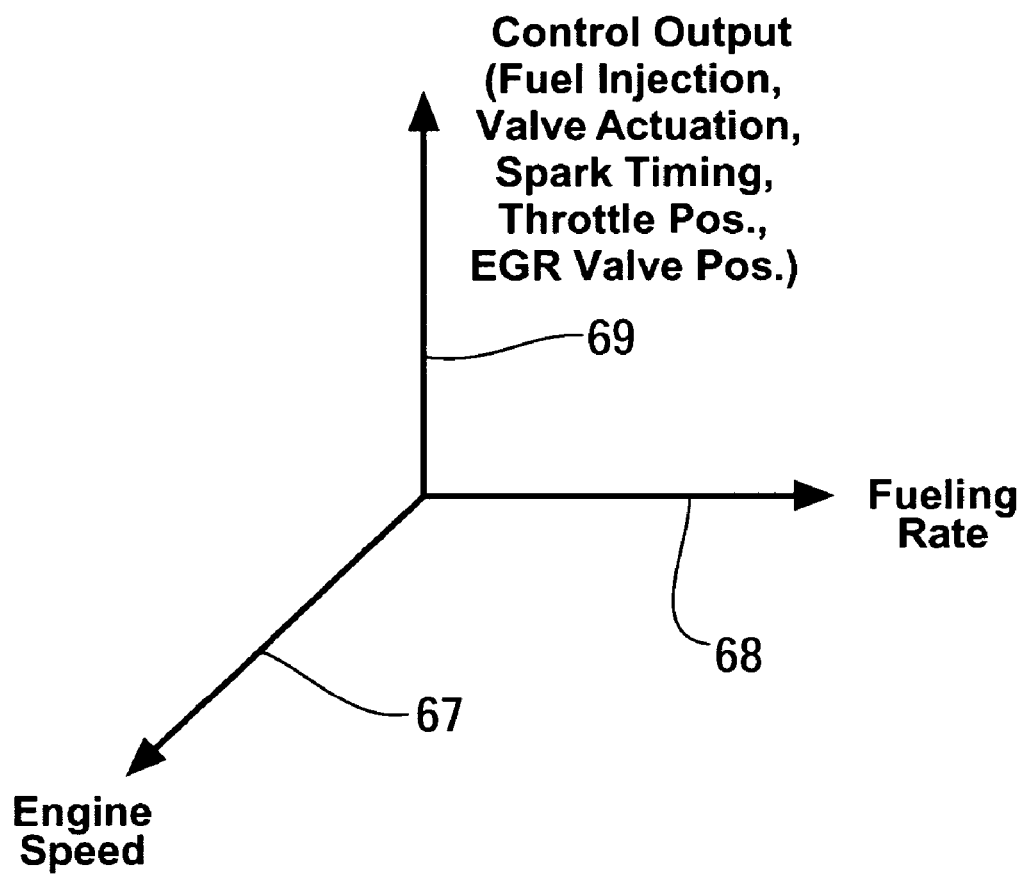
FIG. 6 is a graph showing the detailed structure of the lookup table used in the feed forward control.
Figure 7A:
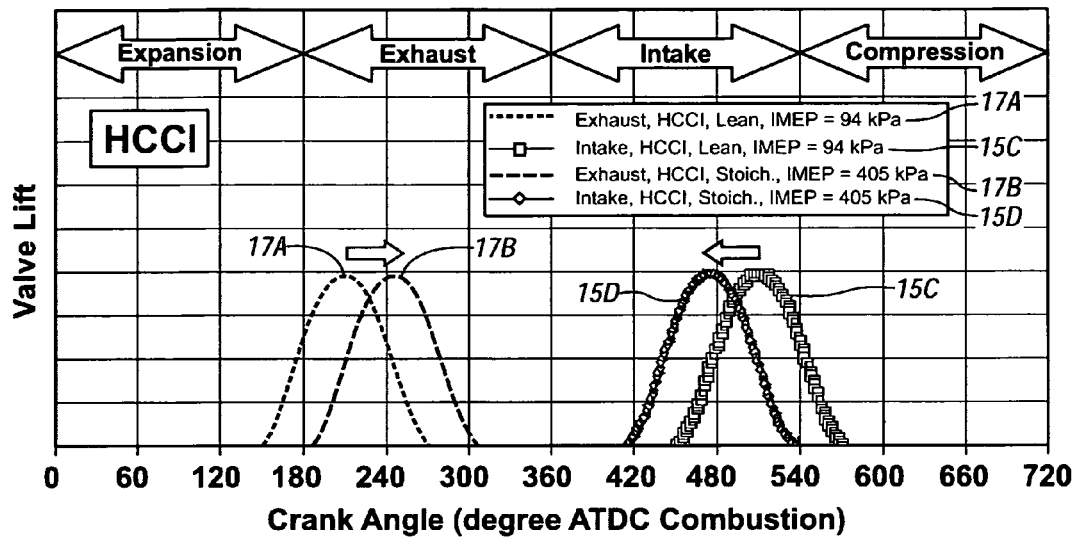
FIGS. 7A-7D are graphs of four valve actuation positions in VVA strategy 1 for transition from HCCI to SI-NTLC to SI Throttled operation.
Figure 7B:
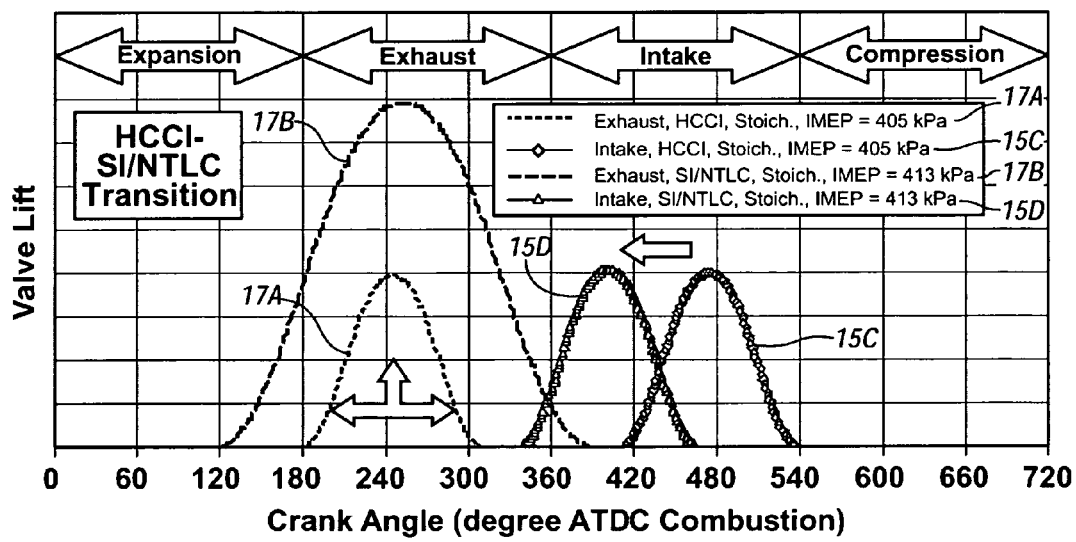
Figure 7C:
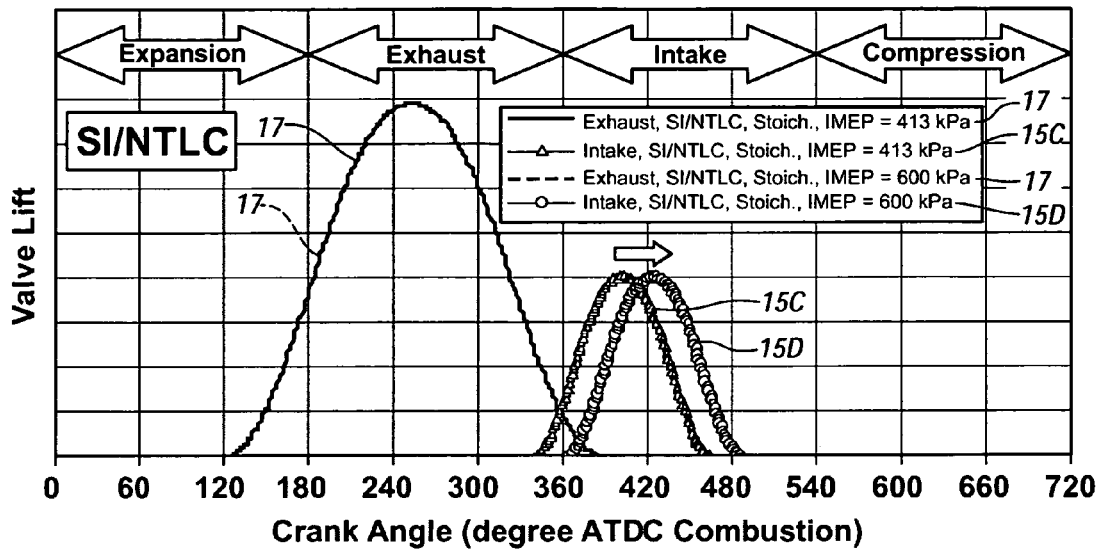
Figure 7D:
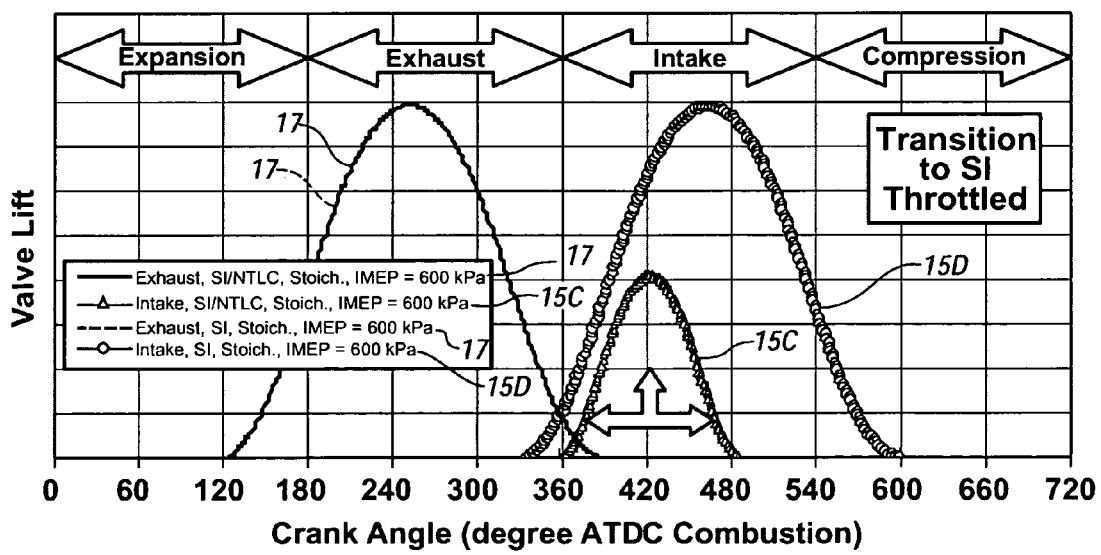

FIG. 6 is an operational diagram of a lookup table in which two input variables are engine speed 67 and load 68 and control output variables 69 for both SI and HCCI are stored. These variables include fuel injection, valve actuation, spark timing, throttle and EGR valve positions. For example, the transition between HCCI and SI begins about 460 kPa IMEP. The load at which the transition takes place changes with engine speed. In particular, SI-HCCI transition starts at lower load (or IMEP) with higher engine speed. A linear interpolation between corresponding control outputs from each combustion mode is used during mode transition. The values stored in the lookup tables are generated under steady-state engine operating conditions. It is demonstrated experimentally that the engine operating conditions do converge to their steady-state values after transition.

The feedback part is used to further enhance the overall system performance. Although all feed forward control outputs can be subject to feedback control before input to the engine controller, only NVO, throttle position and EGR valve position are activated during mode transition.

It should be noted that, unlike the more conventional SI engines, the fueling rate is not necessarily proportional to the driver-requested torque (or load, which is based on the pedal input) for the proposed application. Due to the more complex nature of many possible combustion modes, it is not uncommon that an SIDI/HCCI engine actually produces more torque for slightly less fueling rate for different combustion modes. It is crucial to determine the proper injection strategy and the fueling rate for each combustion mode depending on the requested torque and engine operating condition as will be discussed later. Therefore, it should be understood that the different fueling rates used in the tests reported hereafter are intended only to demonstrate the load transient control methodology under varying engine loads. The exact mapping from the driver-requested engine torque to the required fueling rate must be developed for the operational conditions of each engine model.

FIGS. 7A, 7B, 7C, and 7D show representative exhaust 17 and intake 15 valve lift profiles used for steady state and transient engine operations under HCCI, HCCI-SI/NLTC transition, SI/NTLC mode, and SI/NTLC-SI Throttled transition, respectively. The load for transition from HCCI to SI/NLTC is chosen to be around 410 kPa IMEP at 1000 rpm (as seen in FIG. 4) to illustrate the change in valve actuation. It is apparent from FIGS. 7A-D that: 1) As NVO is decreased (17A, 15C to 17B, 15D), engine load is increased in the HCCI mode (FIG. 7A); 2) During the transition from HCCI to SI/NLTC (FIG. 7B), the exhaust valve profile is changed from low lift 17A to high lift 17B, increasing both lift and duration, while only the phasing, or timing, of the intake valve is changed (advanced 15C to 15D). (Note that the intake valve closing timing is around 80 degrees before BDC in the SI/NLTC mode); 3) In the SI/NLTC mode (FIG. 7C), intake valve phasing alone is sufficient for load control. (In particular, the intake valve lift profile is retarded (15C to 15D) to increase engine load); and 4) During transition from SI/NLTC to SI Throttled mode (FIG. 7D), the intake valve timing is retarded and the valve profile is changed from low lift 15C to high lift 15D, increasing both lift and duration, while the exhaust valve 17 profile remains unchanged in the high lift condition.

Figure 8A:
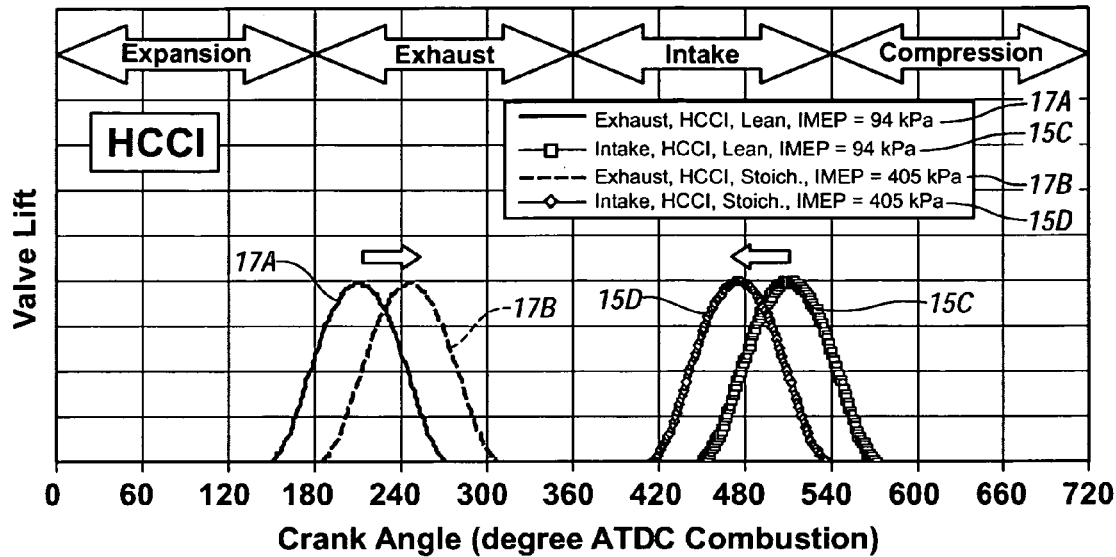
FIGS. 8A & B are graphs of two valve actuation positions in VVA strategy 2 for direct transition from HCCI to SI Throttled operation.

It is also possible to transition from the HCCI mode directly to the SI mode and vice versa. As shown in FIG. 8A, load control in the HCCI mode can be achieved by controlling NVO (in the same manner as in FIG. 7A). In particular, as NVO is decreased, load is increased.

Figure 8B:
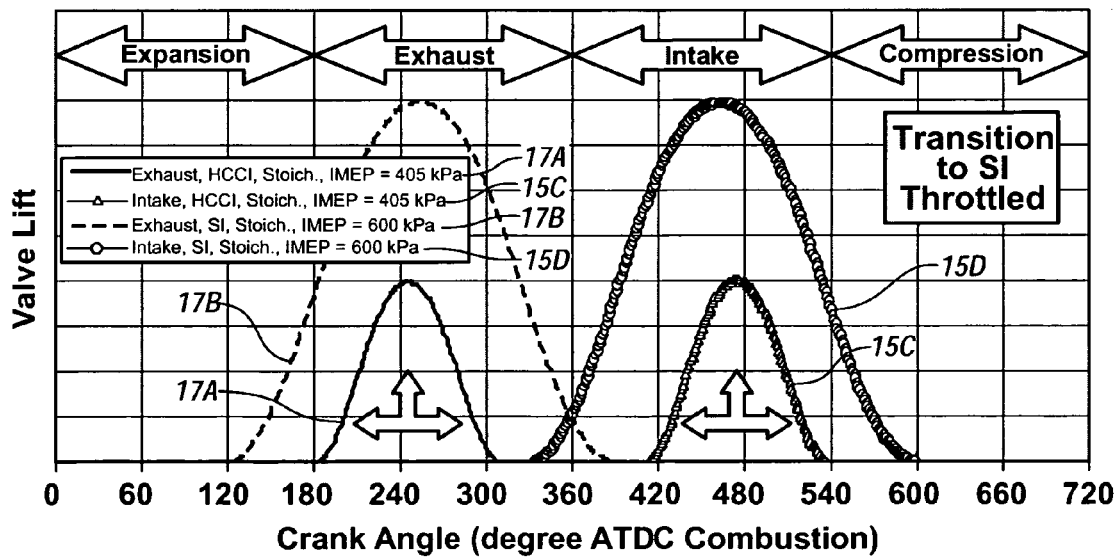

FIG. 8B shows the valve profiles during the transition between the HCCI and SI modes. To switch to SI, both intake and exhaust valve profiles are changed from low lift 17A, 15C to high lift 17B, 15D and intake valve phasing is advanced, increasing both lift and duration and adjusting valve timing to the conventional valve lift operation for a throttled spark ignition engine. In the SI Throttled mode (FIG. 8B), throttle alone is sufficient for load control.

It is necessary to maintain a desirable air-fuel ratio during transitions between HCCI and SI combustion modes to avoid misfires and partial burns. Following is description of three air-fuel ratio control methods that can be employed.

The effectiveness of the present invention is demonstrated using test results with HCCI-SI transition at 1000 rpm and 460 kPa IMEP. FIG. 9 summarizes the steady-state operating conditions for the two combustion modes before and after the transition. A linear interpolation between end-point values is used as feed forward control outputs during transition. It is noted that the value of NVO (equals IVO−EVC) is negative with SI operation, indicating traditional valve overlap between the exhaust and intake valves, as FIG. 5 illustrated.

A total of 6 tests were conducted as shown in FIG. 10. Cases 1-3 differ in the change rates of the NVO and EGR valve positions ranging from 8 to 16 cycles (1 to 2 seconds) with combustion mode transition from SI to HCCI. Similar tests were done with mode transition from HCCI to SI in cases 4-6. For all cases examined, a step change in throttle change rate was used. Nevertheless, tests with different throttle change rates have shown similar results.

In FIGS. 9 to 25, reference numerals 71 to 73 identify cases 1 to 3, respectively, involving transitions from spark ignition to controlled auto-ignition (SI-HCCI) combustion. Numerals 74 to 76 identify cases 4 to 6, respectively, HCCI-SI transitions. In FIG. 9, the following labels are used for command inputs and other measured values as follows: A—fuel rate; A1—first injection; A2—second injection; B—engine rpm; C1—end of first injection; C2—end of second injection; D—SI (spark timing); E—NVO; F—IMEP; G—A/F; H—EGR valve position; I—throttle position; J—intake $O_2$ percent; K—exhaust gas temperature; L—LPP (location of peak pressure); and M—max. rate of pressure rise.

Figure 11:
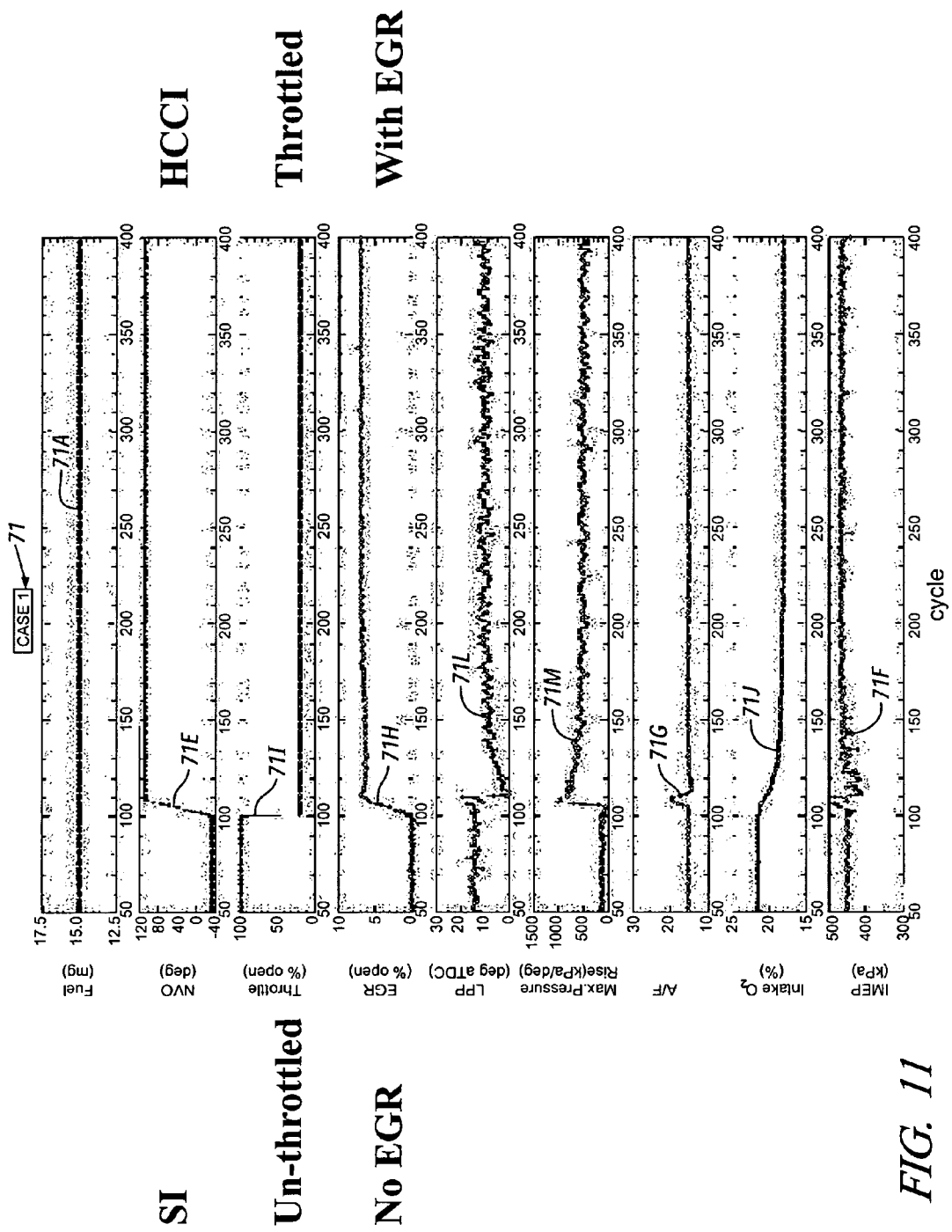
FIGS. 11-13 are composite graphs of all test results for cases 1-3.
Figure 12:
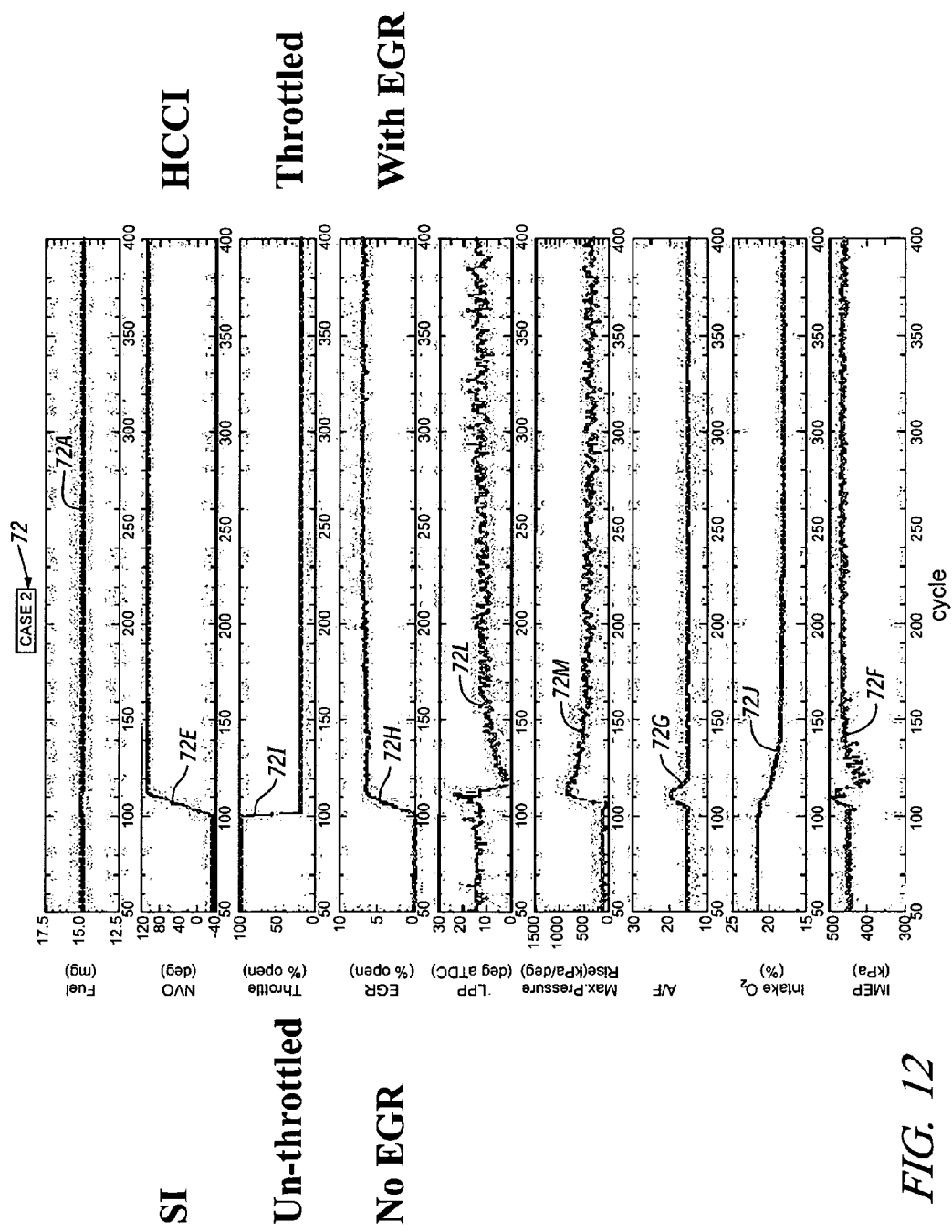
Figure 13:
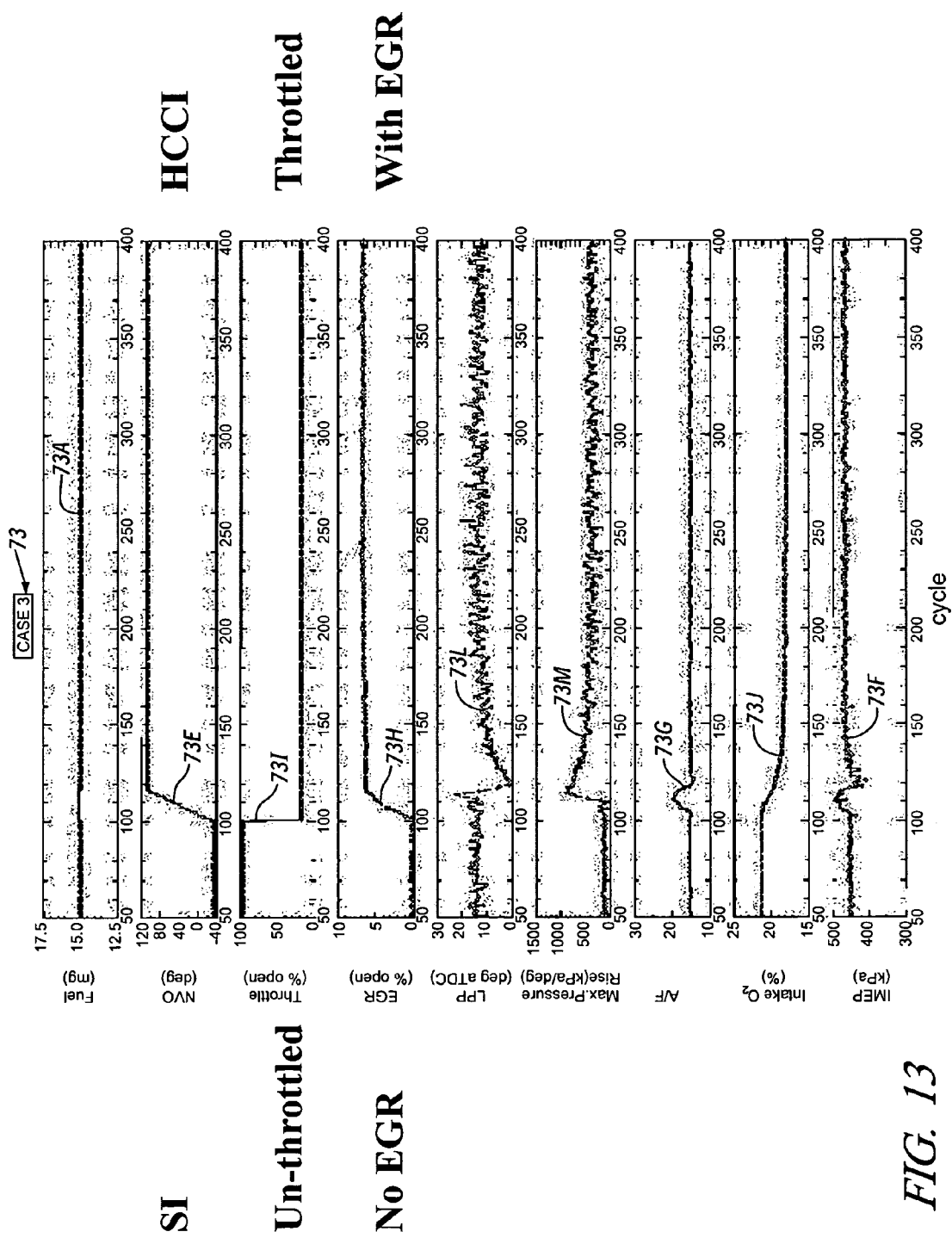

FIGS. 11-13 show composite plots of all test results for SI to HCCI transition cases 1-3, respectively. Recorded values include A—fuel rate; E—NVO; I—throttle position; H—EGR valve position; L—LLP; M—max. rate of pressure rise; G—A/F; J—intake $O_2$ percent; and F—IMEP. Exemplary results of these cases are presented as follows.

Figure 14A:
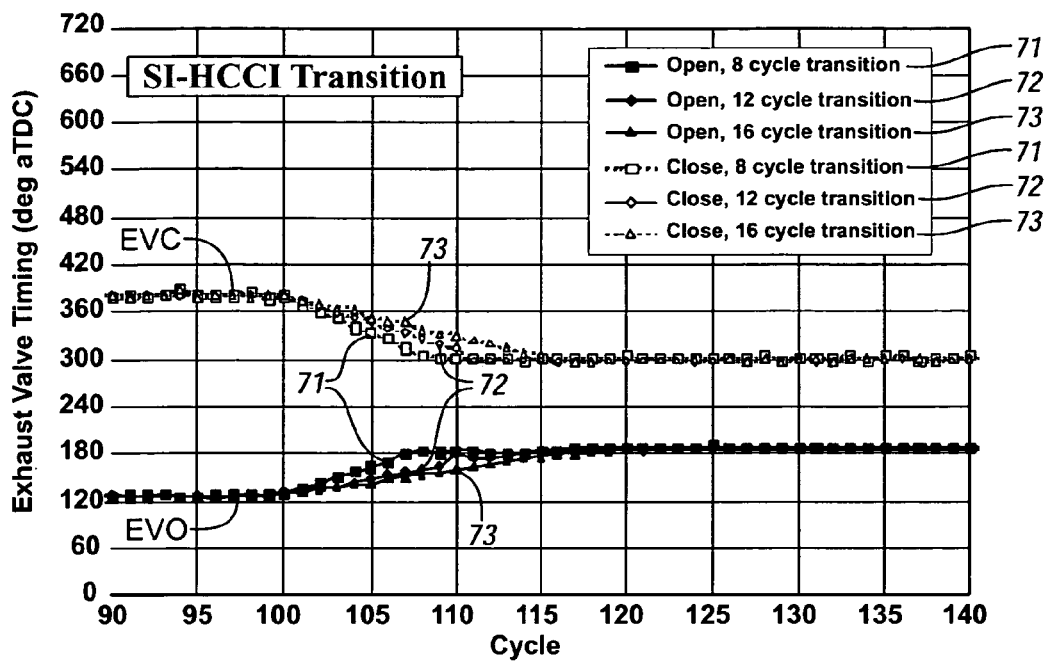
FIGS. 14A & B are composite graphs showing opening and closing valve timings, respectively, for cases 1-3 from SI to HCCI transition.
Figure 14B:
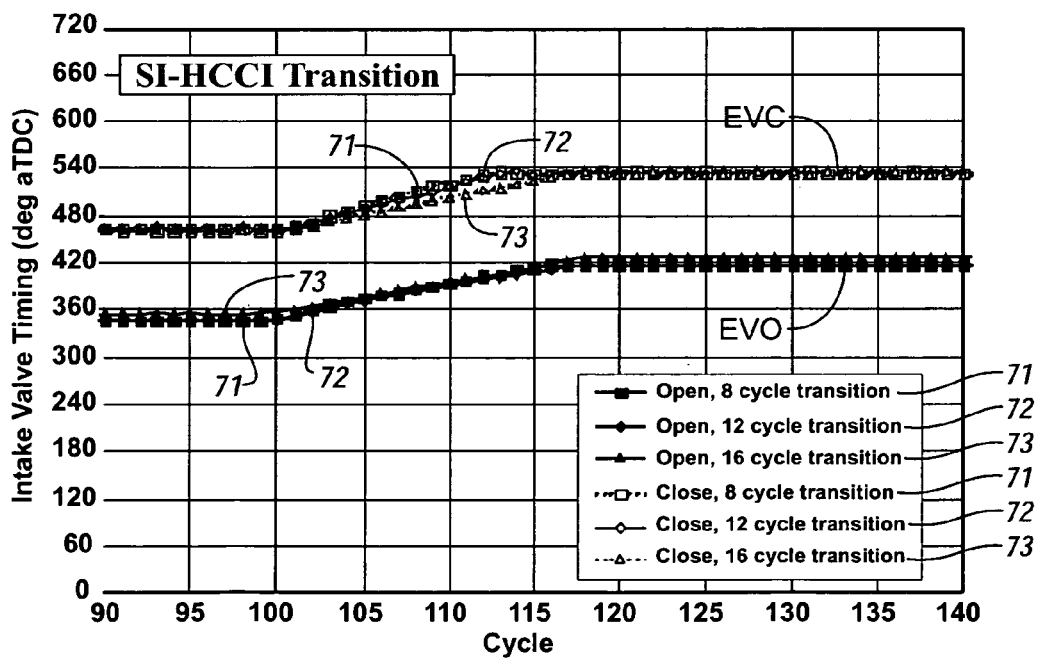
Figure 15A:
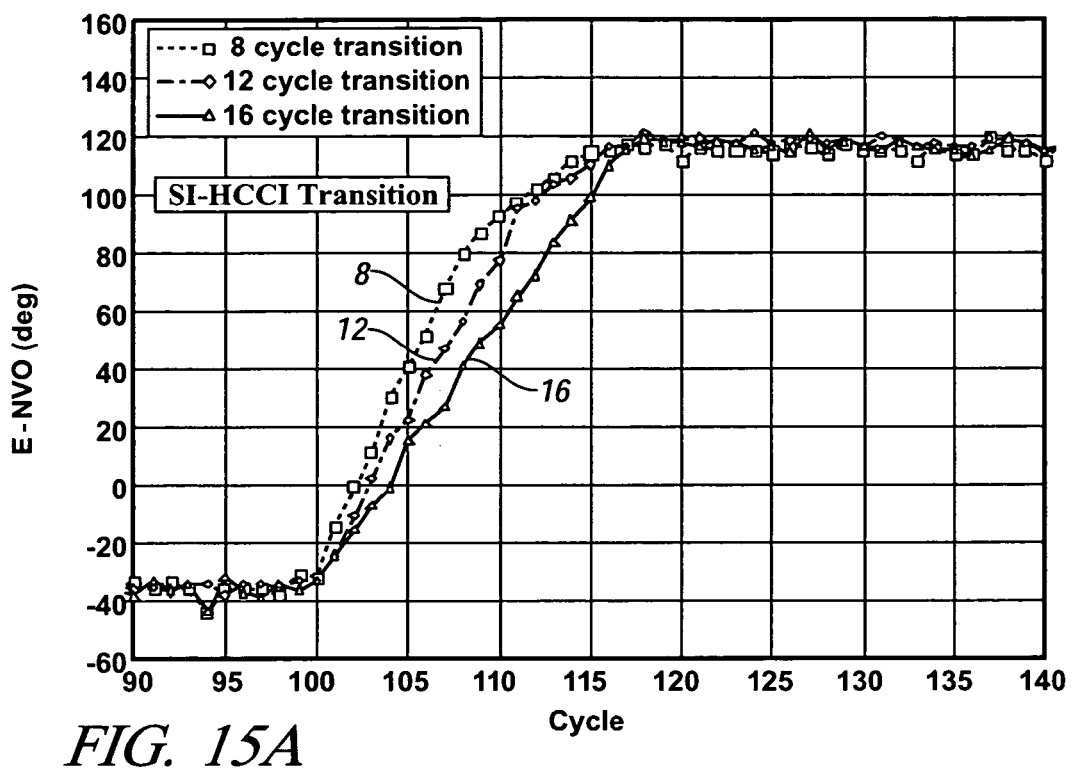
FIGS. 15A & B are composite graphs showing NVO and air/fuel ratio, respectively, for cases 1-3 from SI to HCCI transition.

Opening and closing timings of exhaust and intake valves are presented first in FIGS. 14A and 14B, respectively, with different change rates from 8 to 16 cycles (about 1 to 2 seconds) during transition. The NVO used during transition is shown in FIG. 15A. This is made possible with the fully flexible valve actuation system used in these tests of the invention. Different valve profile change rates are easily programmed and controlled. This capability is not possible for a simple two-step VVA system since the valve lift profile can only be changed in a single cycle.

Figure 15B:
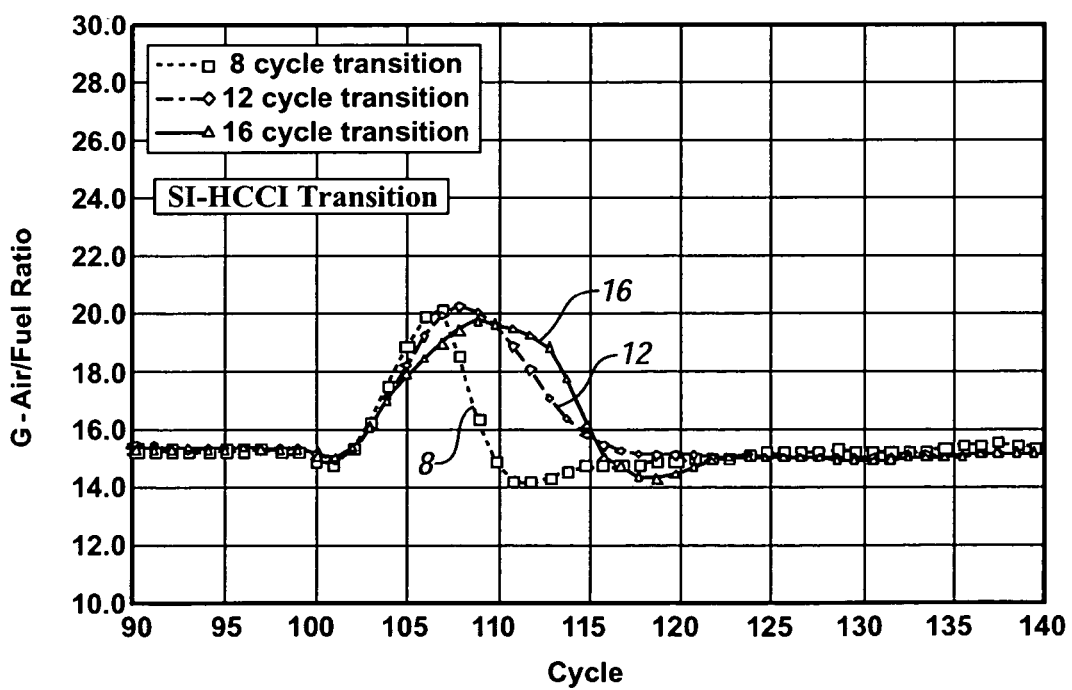

The measured air-fuel ratio is shown in FIG. 15B. It is clear from the figure that the air-fuel ratio went through a lean excursion. The excursion duration reduces with increasing NVO and EGR valve change rates. The maximum deviation from stoichiometry, however, remained the same at about 5 air-fuel ratios.

Lean excursions due to combustion mode transition have been observed in GP 306189 during load transient with deceleration fuel cut off (DFCO). This was particularly evident during hot restart because it takes time for the residual gas fraction in the cylinder to rise up from zero to its steady state value. Zero in-cylinder residual gas before hot restart is the result of engine motoring during the fuel cut off period. It is clear from heat release analyses of measured pressure data that the first 3-4 cycles after hot restart are SI combustion that eventually transition into either pure or spark-assisted controlled auto-ignition combustion.

Figure 16A:
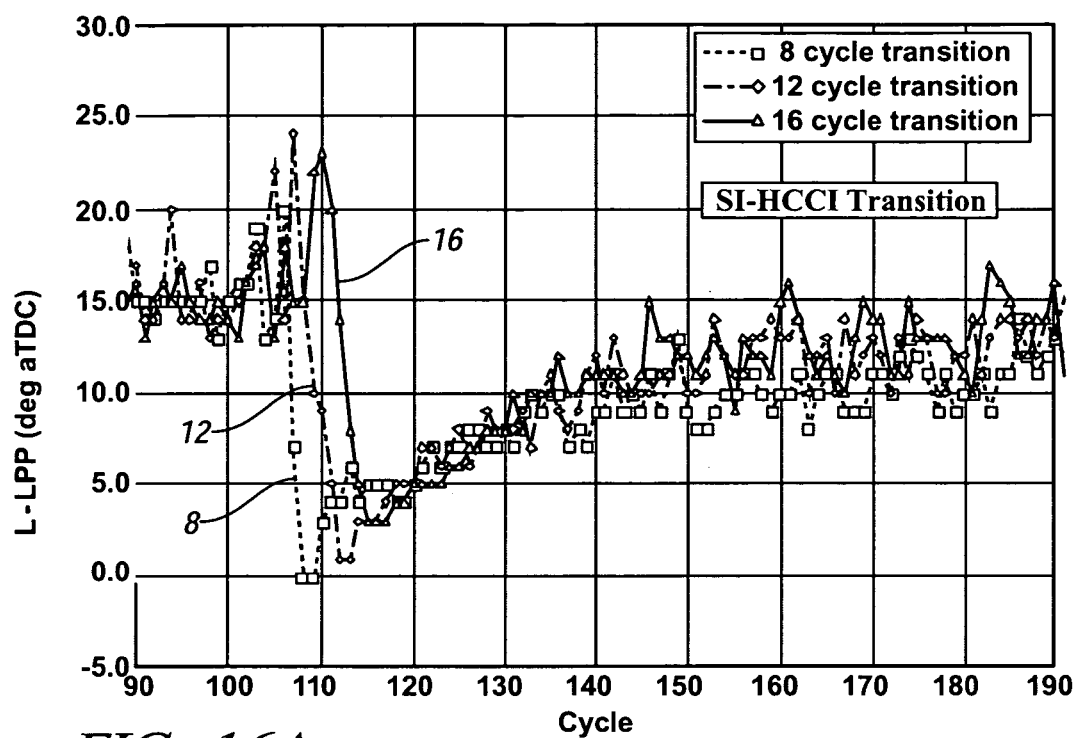
FIGS. 16A & B are composite graphs showing measured location of peak pressure (LPP) and maximum rate of pressure rise, respectively, for cases 1-3 from SI to HCCI transition.
Figure 16B:
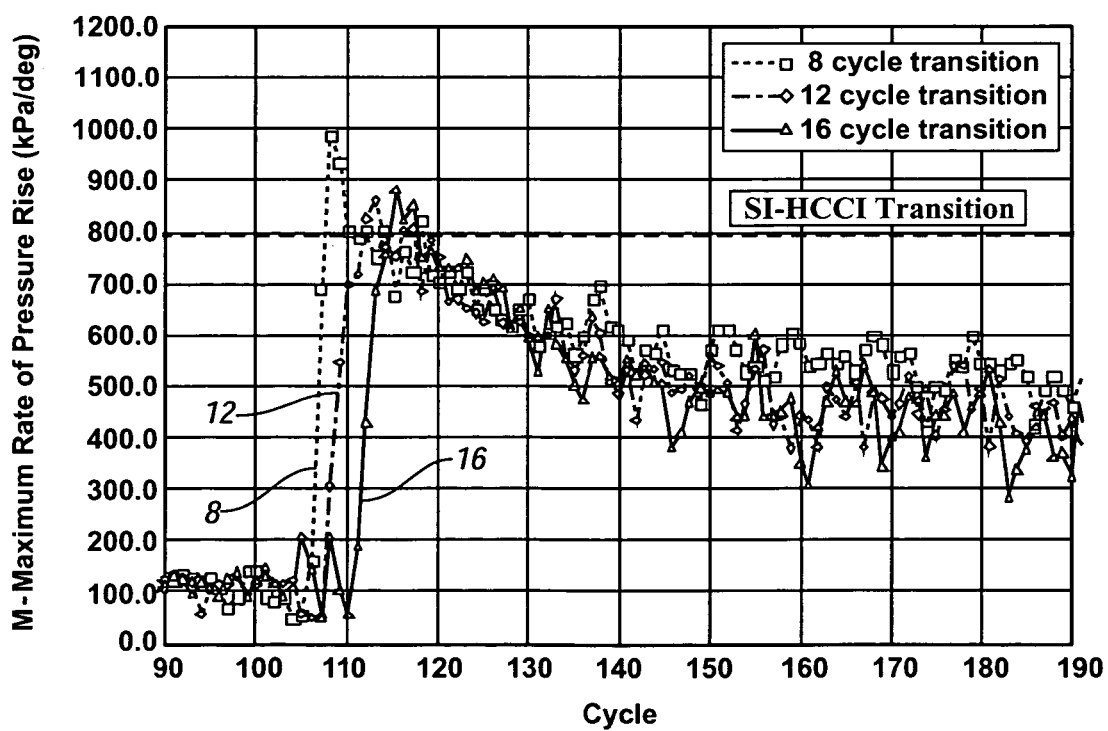
Figure 17:
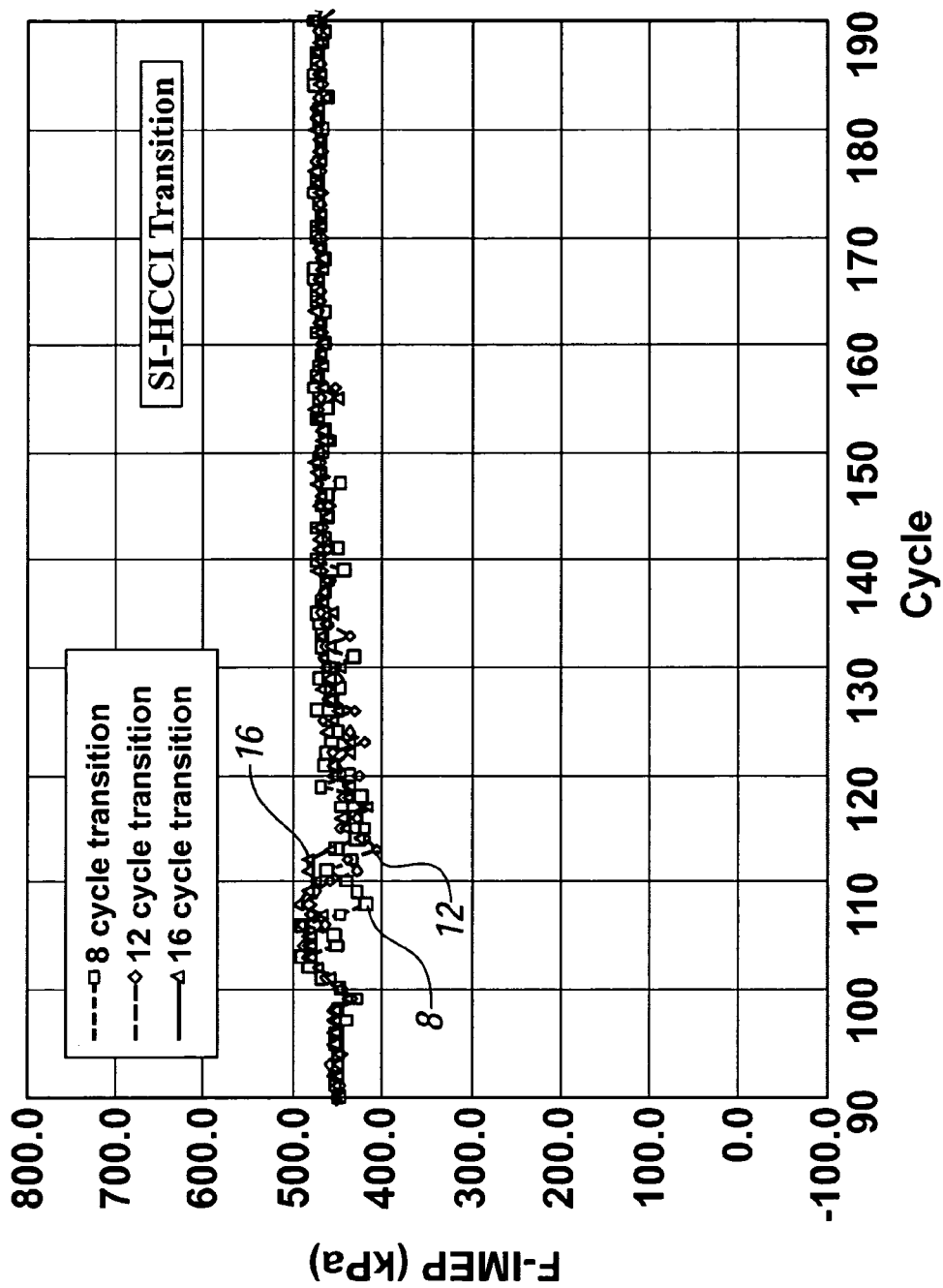
FIG. 17 is a composite graph showing measured IMEP for cases 1-3 from SI to HCCI transition.
Figure 18A:
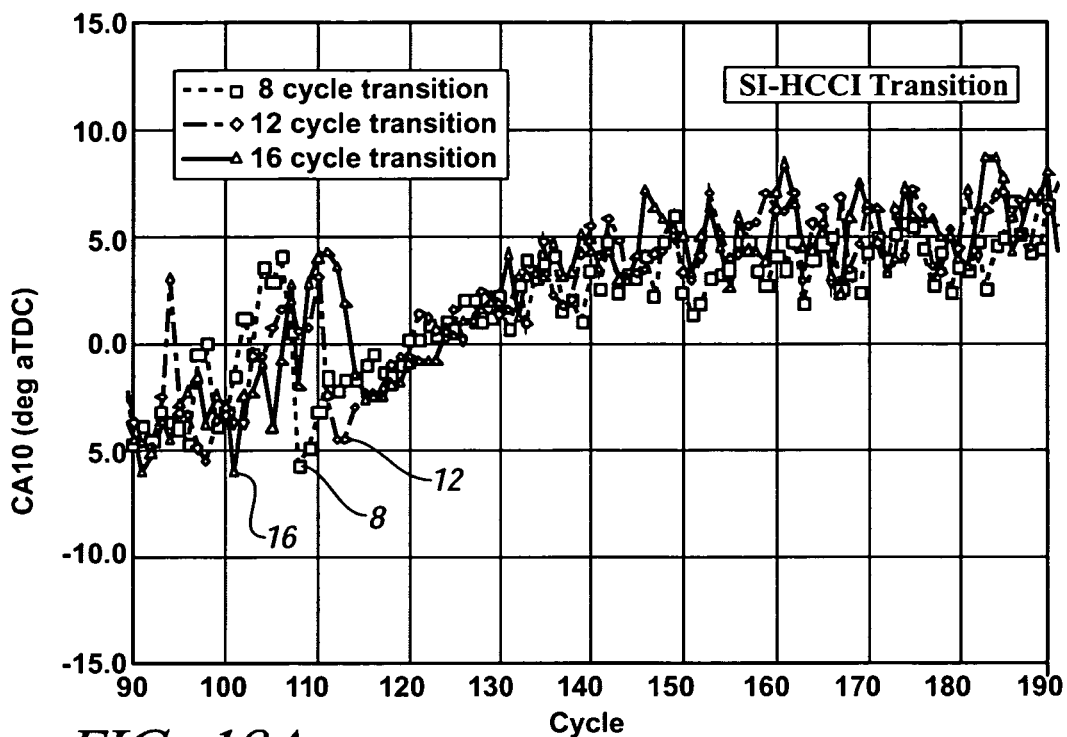
FIGS. 18A & B are composite graphs showing crank angle positions for calculated 10% and 50% burned fuel mass fractions for cases 1-3 from SI to HCCI transition.
Figure 18B:
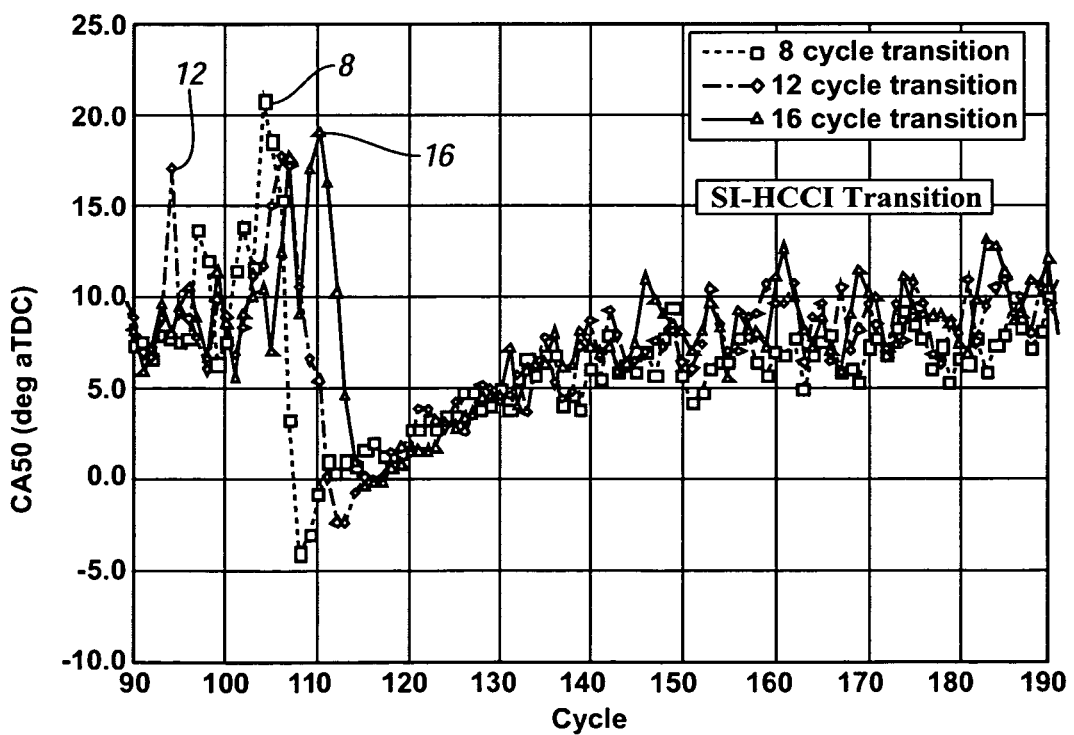

These lean excursions resulted in too much LPP advance as shown in FIG. 16A, hence the maximum rate of pressure rise as shown in FIG. 16B. In particular, the maximum rate of pressure rise is either equal or slightly above 800 kPa/deg, a self-imposed knock limit. Further, both LPP and maximum rate of pressure rise show much longer relaxation time (about 100 cycles) than the actual VVA transition time (8 to 16 cycles). This is typical for engine operation near the high load operation limit due to its sensitivity to engine thermal boundary conditions. The relaxation time of both measured IMEP (FIG. 17) and calculated 10 and 50 percent fuel burned locations (FIGS. 18A and 18B) show similar characteristics.

Figure 19:
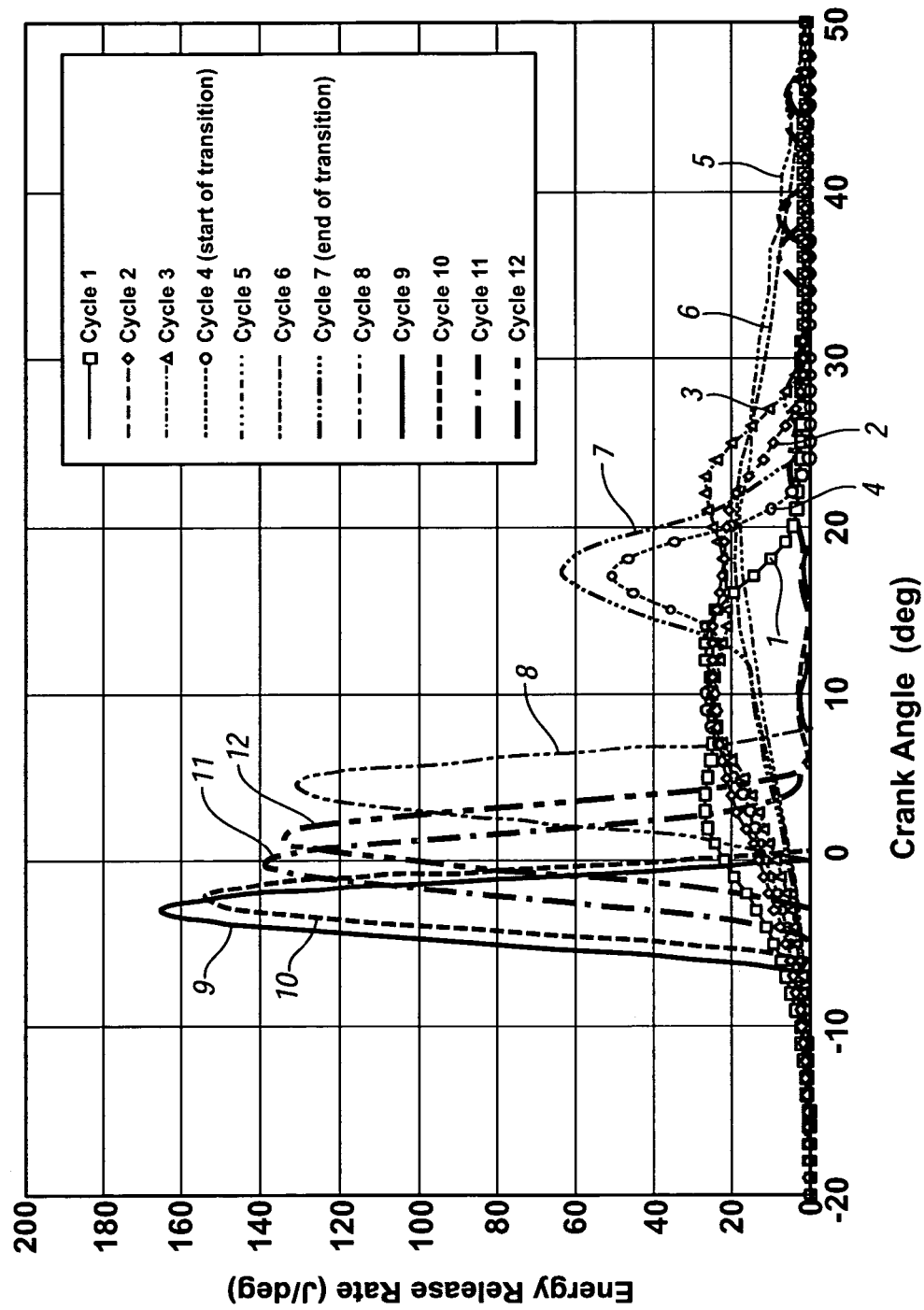
FIG. 19 is a composite graph showing calculated energy release rate vs. number of cycles for case 1 from SI to HCCI transition.

FIG. 19 shows calculated energy release rate in cycles after the start of transition. It is clear from the figure that cycles 1-3 have peak energy release and burn duration typical of those found in SI combustion. Beyond cycle 8, the energy release characteristics exhibit that of HCCI combustion with very high peak rate and very short burn duration. The combustion phasing is very advanced as shown earlier in FIG. 16A. Between cycles 4 and 7, however, SI combustion with and without auto-ignition or knocking is evident. The complexity of the combustion mode transition is clearly illustrated.

Figure 20:
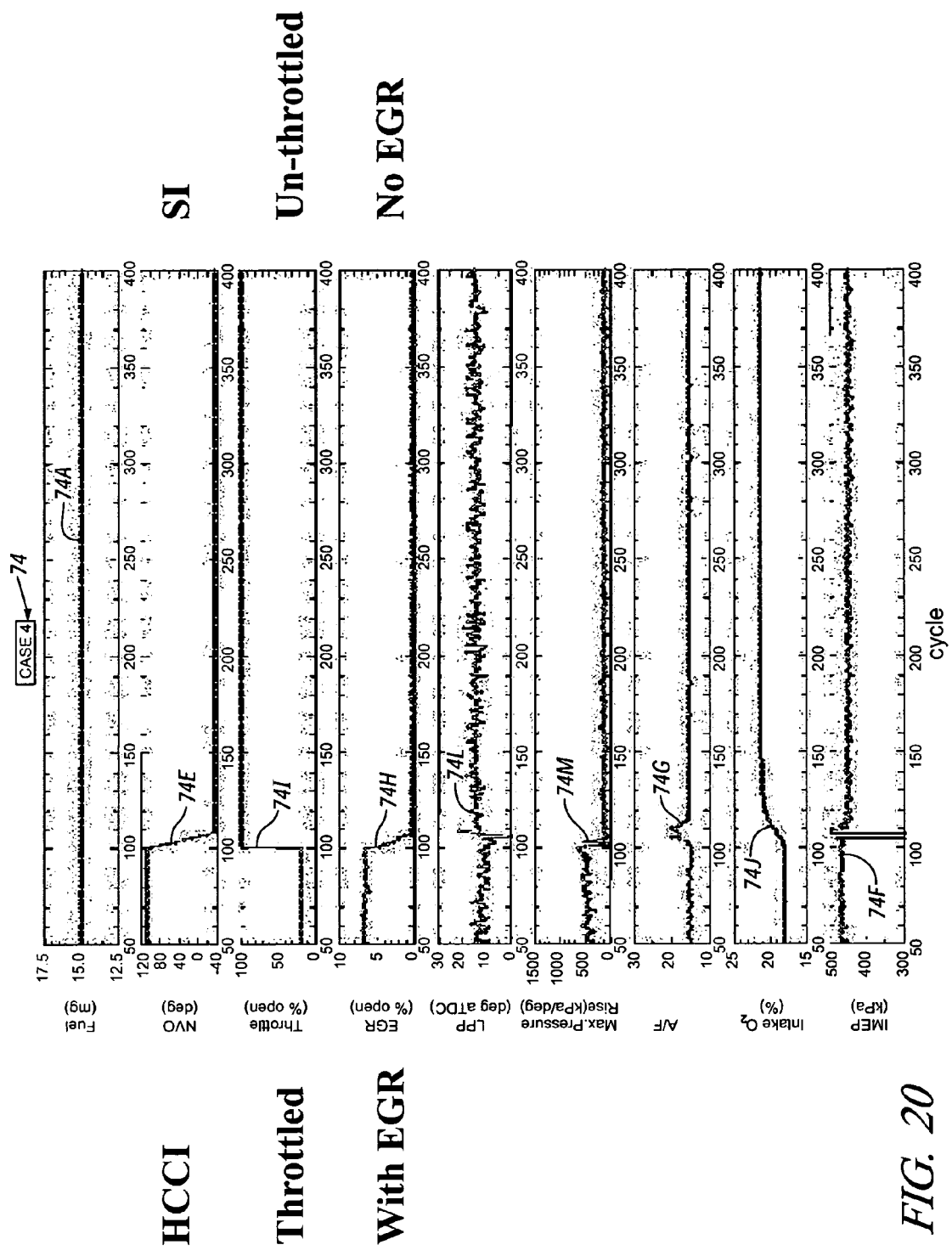
FIGS. 20-22 are composite graphs of all test results for cases 4-6, respectively.
Figure 21:
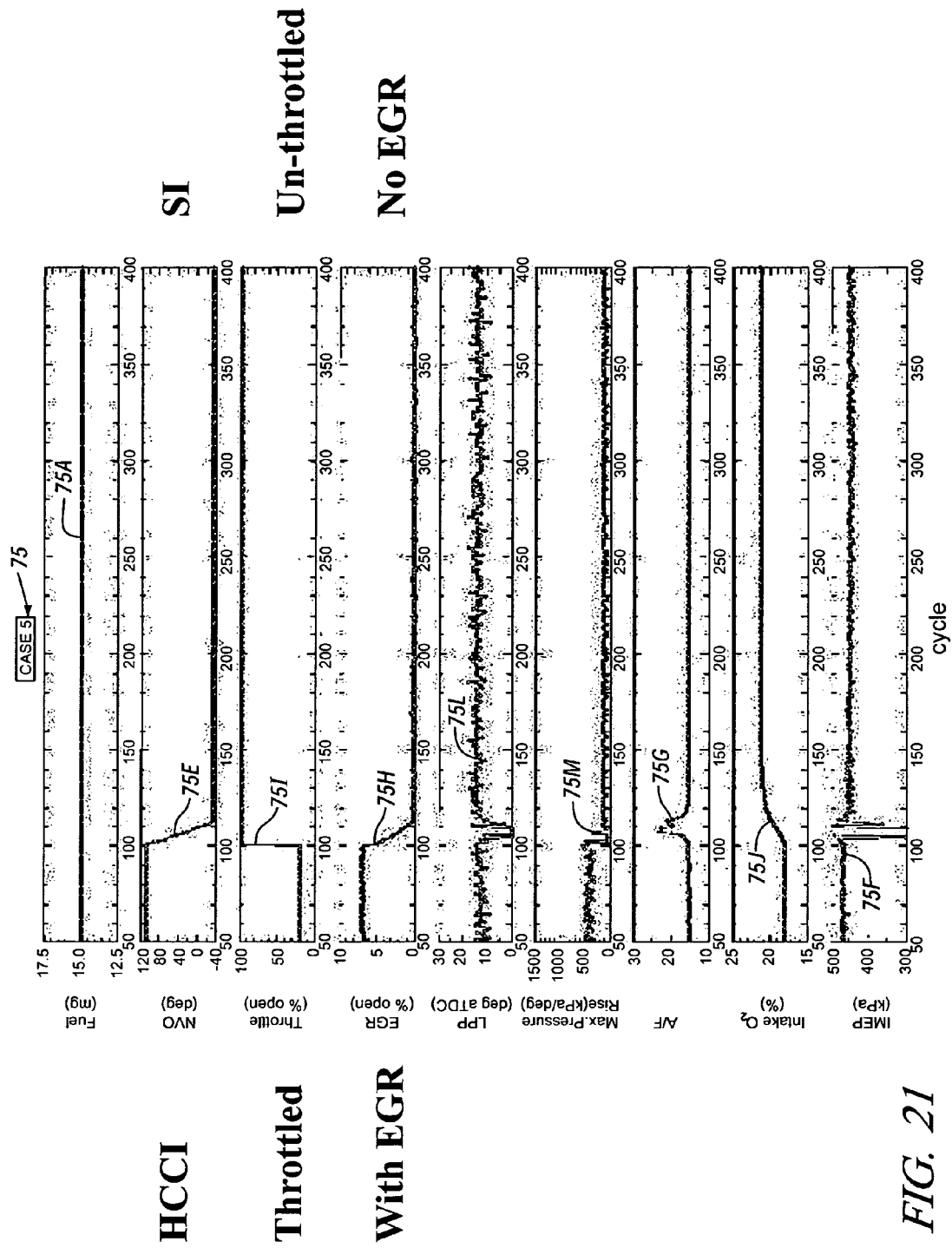
Figure 22:
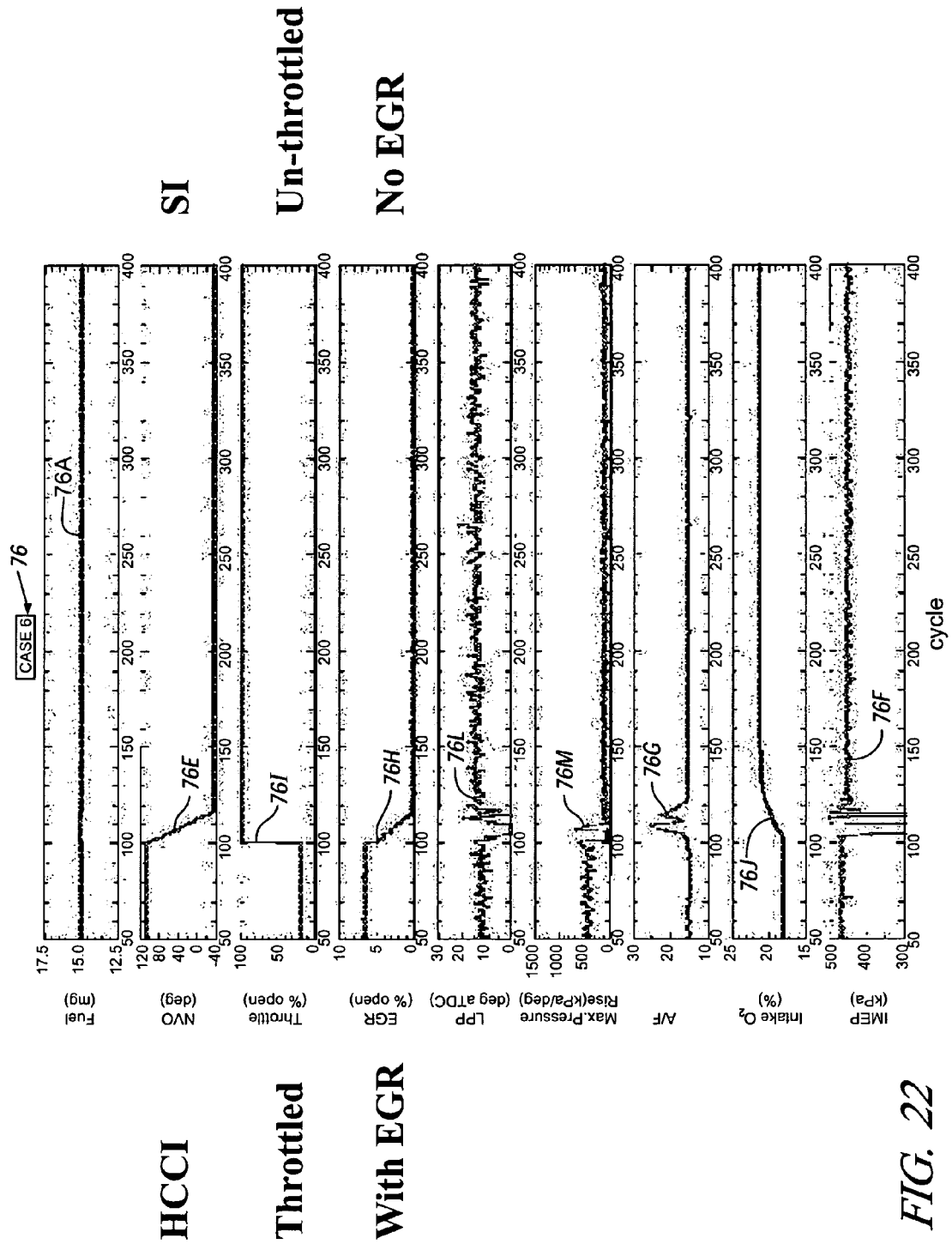

FIGS. 20-22 show composite plots of all test results for HCCI to SI transition cases 4-6, respectively. Recorded values include A—fuel rate; E—NVO; I—throttle position; H—EGR valve position; L—LLP; M—max. rate of pressure rise; G—A/F; J—intake $O_2$ percent; and F—IMEP. Exemplary results of these cases are presented as follows.

Figure 23A:
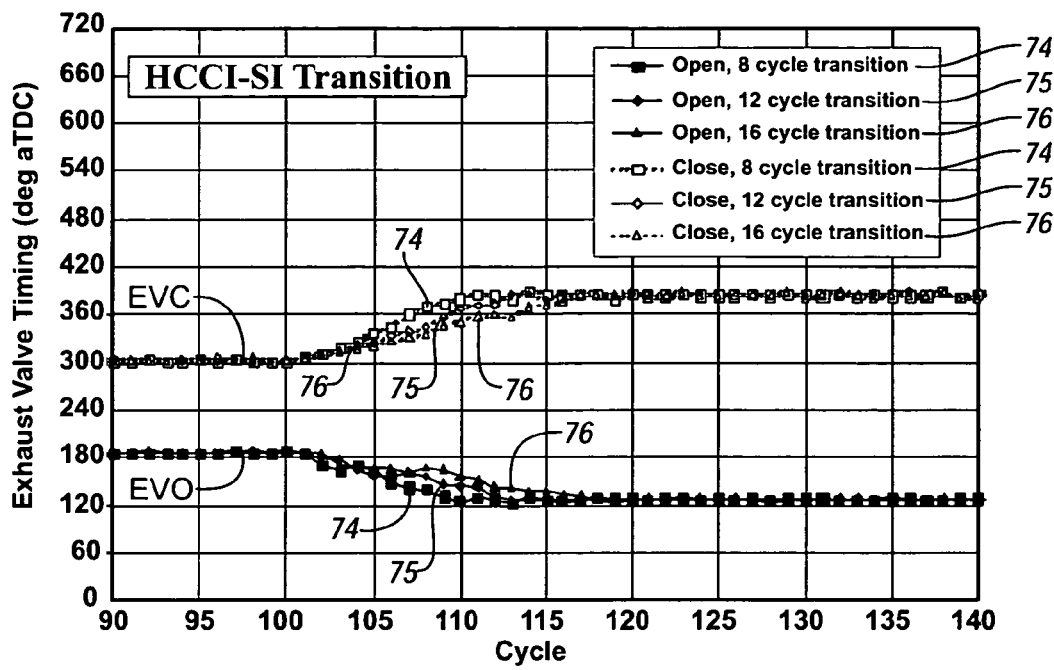
FIGS. 23A & B are composite graphs showing opening and closing valve timings, respectively, for cases 4-6 from HCCI to SI transition.
Figure 23B:
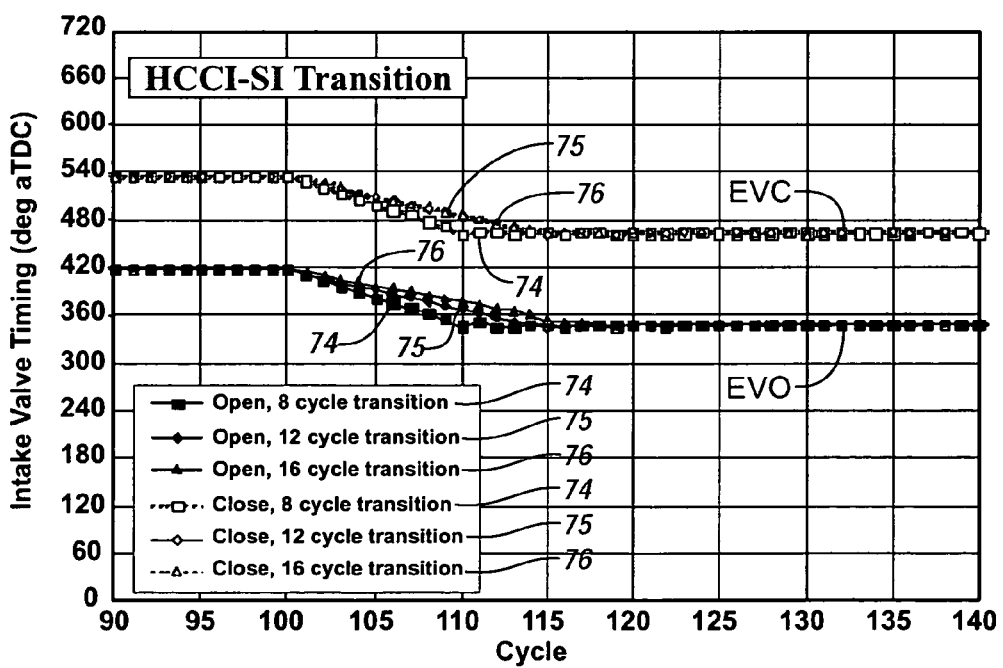
Figure 24A:
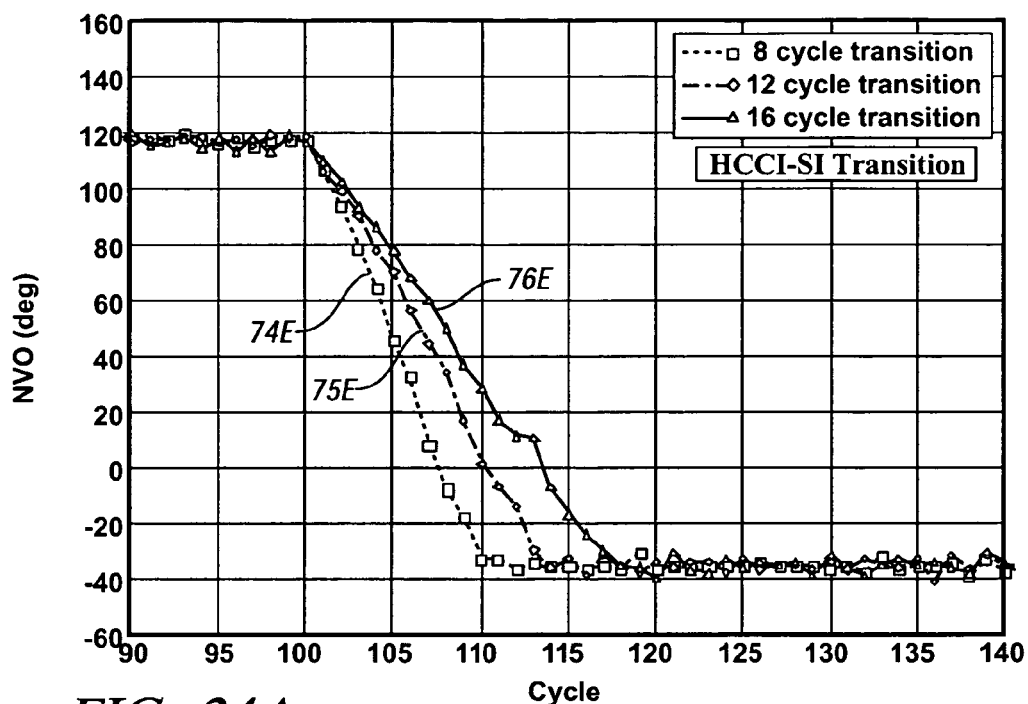
FIGS. 24A & B are composite graphs showing NVO and air/fuel ratio, respectively, for cases 4-6 from HCCI to SI transition.

Both opening and closing timings of exhaust and intake valves are presented first in FIGS. 23A and 23B, respectively with different change rates from 8 to 16 cycles (about 1 to 2 seconds) during transition. The NVO used during transition is shown in FIG. 24A. This is made possible with the fully flexible valve actuation system used in these tests of the invention. Different valve profile change rates are easily programmed and controlled. This capability is not possible for a simple two-step VVA system since the valve lift profile can only be changed in a single cycle.

Figure 24B:
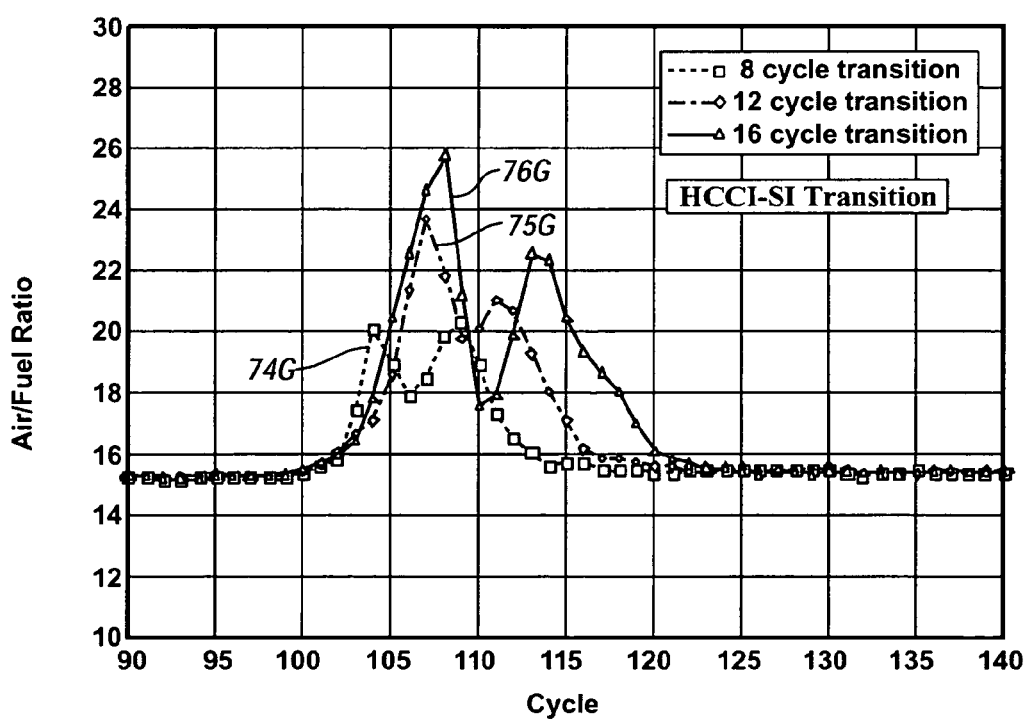
Figure 25:
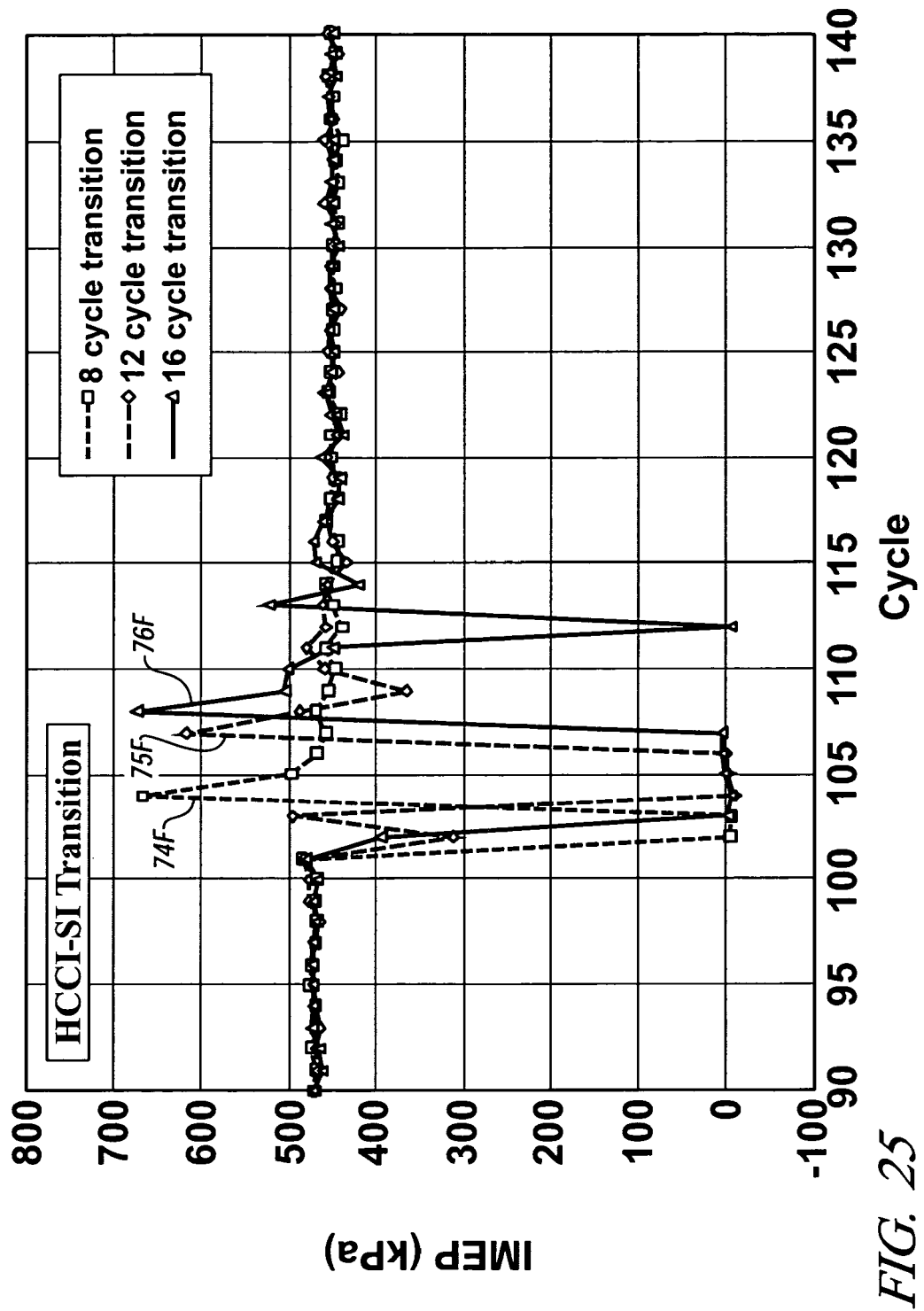
FIG. 25 is a composite graph showing measured IMEP for cases 4-6 from HCCI to SI transition.

The measured air-fuel ratio is shown in FIG. 24B. It is clear from the figure that the air-fuel ratio went through a lean excursion. The duration of the lean excursion is reduced with increasing NVO and EGR valve change rates. The shape of excursion exhibits a double hump. The maximum deviation from stoichiometry can vary between 5-10 air-fuel ratios and appears during the first hump. The larger air-fuel ratio excursion for HCCI to SI transition (FIG. 24B) as compared to the SI to HCCI transition (FIG. 15B) is caused by the misfiring and partial-burns during the mode transition as clearly indicated in FIG. 25. Best results were obtained with the fastest NVO and EGR change rate (case 4, 8 cycle transition).

The in-cylinder gas temperature during the expansion or exhaust stroke is much lower for HCCI combustion than for SI combustion at the same engine load. This is caused mainly by higher EGR dilution (both internal and external) with the HCCI combustion. The result is lower combustion chamber surface temperature and exhaust gas temperature. During mode transition from SI to HCCI, both higher trapped exhaust gas temperature and combustion chamber surface temperature favor HCCI combustion if steady-state look-up table values are used as control input. Thus the transition is always stable even with the existence of lean excursions. Less favorable thermal conditions in conjunction with lean excursions cause deterioration in combustion robustness during mode transition from HCCI to SI. Such may explain the less robust nature of HCCI to SI transitions when compared to SI to HCCI transitions. The lean air-fuel ratio limit for SI combustion is about 25:1 for the engine used.

A first method for controlling the air-fuel ratio in a gasoline direct-injection controlled auto-ignition engine at constant fueling rate employs a flow control valve in one branch of the intake runners for a two-intake-valve per cylinder engine. Both throttle valve and EGR valve (to some extent) used for feed forward control can also be used for such a purpose. It is found experimentally that variation of the flow control valve setting has a profound effect on the amount of fresh charge inducted into the cylinder, hence the delivered air-fuel ratio. The effectiveness of the flow control valve on air-fuel ratio control differs depending on the valve strategy and the engine speed. In particular, closing the flow control valve results in lower delivered air-fuel ratio and the rate of reduction increases with increasing engine speed. A second method employs variable valve lift control. The effectiveness of valve lift for air-fuel ratio control varies depending on the engine speed and valve strategy used for controlled auto-ignition combustion. In general, the delivered air-fuel ratio decreases with decreasing valve lift. The effectiveness of valve lift control on air-fuel ratio increases with increasing engine speed. In particular, for the exhaust recompression valve strategy, the delivered air-fuel ratio decreases with decreasing exhaust valve lift as the only change. The intake valve lift has no appreciable effect on the delivered air-fuel ratio. A third method is intended to be used in conjunction with a mechanical two-step with cam phasing system. Since the two-step mechanism implies changing the exhaust lift profile in 1 cycle during transition, the lean excursion from HCCI to SI can become even larger than those observed in cases 4-6 (FIG. 24B) with the finite, more extended, VVA change rate. Feedback control using measured air-fuel ratio to dynamically adjust the throttle valve position can be an effective method. The intake cam phaser is another candidate that can be used either alone or in conjunction with the throttle valve for air-fuel ratio control. The EGR valve, to some extent, can also be used for air-fuel ratio control. However, it can pose adverse effects on combustion stability if the intake is too diluted.

In summary, the present invention improves transition between controlled auto-ignition and flame propagation combustion in gasoline direct-injection engines. Methods to further improve the combustion robustness during combustion mode transitions are also proposed.

It should be understood that the broad concepts of the present invention are not limited to use with the exemplary feed forward/feedback control system referred to in the application. Nor is the invention limited to the use of controls based upon lookup tables as discussed herein. Further, for an engine operable in multiple modes of operation over its full operating range, some engine control inputs used in one mode of operation may be inactive in another mode.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

The invention claimed is:

1. Method for control of transition between combustion modes of a direct-injection engine operable in a homogeneous charge compression ignition (HCCI) mode at lower loads and a spark ignition flame propagation (SI) mode at higher loads wherein the engine includes a variable valve actuation system including two-step high and low lift valve actuation and separate cam phasing for both intake and exhaust valves, the method comprising:

operating the engine at steady state, with fuel-air-exhaust gas mixtures at predetermined conditions, for each speed and load, of fueling mass flow rate (fueling rate), injection timing (FI), spark timing (SI), throttle position, exhaust gas recirculation (EGR) valve setting, and exhaust recompression obtained by negative valve overlap (NVO) between closing of the exhaust valves and opening of the intake valves in each cylinder;

controlling the engine during the HCCI mode by retarding exhaust valve opening and advancing intake valve opening to effect decreasing negative valve overlap with increasing engine load; and controlling the engine during mode changes between the HCCI mode and an SI mode by switching the exhaust and intake valves between low lift for HCCI operation and high lift for SI operation.

2. Method as in claim 1 wherein the SI mode is an SI throttled mode operated with stoichiometric air-fuel ratio and the engine is further operable in an SI non-throttled load control (SI/NTLC) mode at loads between the SI throttled mode and the HCCI mode, and the method includes at least one of:

controlling the engine during mode changes between the HCCI and SI/NTLC modes by switching only the exhaust valve between low lift for the HCCI mode and high lift for the SI/NTLC mode; and controlling the engine during mode changes between the SI/NTLC and SI throttled modes by switching only the intake valve between low lift for the SI/NTLC mode and high lift for the SI throttled mode.

3. Method as in claim 2 including adjusting at least one of the throttle, EGR valve and phasing of the engine valve timing to obtain the predetermined conditions established for steady state operation of the engine after each mode change.

4. Method as in claim 3 including adjusting at least one of the VVA, throttle and EGR valve change rate to control intake O2 concentration and exhaust air-fuel ratio in a manner to limit peak cylinder pressures and minimize misfires during each mode transition.

5. Method as in claim 1 including adjusting at least one of the throttle, EGR valve, and phasing of the engine valve timing to obtain the predetermined conditions established for steady state operation of the engine after each mode change.

6. Method as in claim 5 including adjusting at least one of the VVA, throttle and EGR valve change rate to control intake O2 concentration and exhaust air-fuel ratio in a manner to limit peak cylinder pressures and minimize misfires during each mode transition.

7. Method for control of transition between combustion modes of a direct-injection engine operable in a homogeneous charge compression ignition (HCCI) mode at lower loads and an SI throttled mode operated with stoichiometric air-fuel ratio, wherein the engine includes a variable valve actuation system including two-step high and low lift valve actuation and separate cam phasing for both intake and exhaust valves, the method comprising:

operating the engine at steady state, with fuel-air-exhaust gas mixtures at predetermined conditions, for each speed and load, of fueling mass flow rate (fueling rate), injection timing (FI), spark timing (SI), throttle position, exhaust gas recirculation (EGR) valve setting, and exhaust recompression obtained by negative valve overlap (NVO) between closing of the exhaust valves and opening of the intake valves in each cylinder; and controlling the engine during mode changes between the HCCI mode and the SI throttled mode by operating the engine in an intervening SI non-throttled load control (SI/NTLC) mode; wherein the engine is controlled during mode changes between the HCCI and the intervening SI/NTLC mode by switching only the exhaust valve between low lift for the HCCI mode and high lift for the SI/NTLC mode, and the engine is controlled during mode changes between the intervening SI/NTLC mode and the SI throttled mode by switching only the intake valve between low lift for the intervening SI/NTLC mode and high lift for the SI throttled mode.

8. Method for control of a direct-injection engine operable in a homogeneous charge compression ignition (HCCI) mode at lower loads, an SI throttled mode operated with stoichiometric air-fuel ratio at higher loads, and an intervening SI non-throttled load control (SI/NTLC) mode therebetween, wherein the engine includes a variable valve actuation system including two-step high and low lift valve actuation and separate cam phasing for both intake and exhaust valves, the method comprising:

controlling the variable valve actuation system during the HCCI mode to effect low lift valve actuation of both intake and exhaust valves and cam phasing of both intake and exhaust valves to effect decreasing negative valve overlap with increasing engine load;

controlling the variable valve actuation system during transition between the HCCI mode and the SI/NTLC mode to effect low lift valve actuation of intake valves, transitional valve actuation of only exhaust valves between low lift for the HCCI mode and high lift for the SI/NTLC mode, and cam phasing of intake valves to effect advancing intake valve actuation with increasing engine load;

controlling the variable valve actuation system during the SI/NTLC mode to effect low lift valve actuation of intake valves, high lift valve actuation of exhaust valves, and cam phasing of intake valves to effect retarding intake valve actuation with increasing engine load; and controlling the variable valve actuation system during transition between SI/NTLC mode and the SI throttled mode to effect transitional valve actuation of only intake valves between low lift for the SI/NTLC mode and high lift for the SI throttled mode, and high lift valve actuation of exhaust valves.

9. Method for control of a direct-injection engine operable in a homogeneous charge compression ignition (HCCI) mode at lower loads and in an SI throttled mode operated with stoichiometric air-fuel ratio at higher loads, wherein the engine includes a variable valve actuation system including two-step high and low lift valve actuation and separate cam phasing for both intake and exhaust valves, the method comprising:

controlling the variable valve actuation system during the HCCI mode to effect low lift valve actuation of both intake and exhaust valves and cam phasing of both intake and exhaust valves to effect decreasing negative valve overlap with increasing engine load; and controlling the variable valve actuation system during transition between the HCCI mode and the SI throttled mode to effect transitional valve actuation of intake and exhaust valves between low lift for the HCCI mode and high lift for the SI throttled mode.

10. The method of claim 9 wherein said direct-injection engine is further operable in an SI non-throttled load control (SI/NTLC) mode between said HCCI mode and said SI throttled mode and transitional valve actuation of intake and exhaust valves between low lift for the HCCI mode and high lift for the SI throttled mode further comprises:

controlling the variable valve actuation system during transition between the HCCI mode and the SI/NTLC mode to effect transitional valve actuation of only exhaust valves between low lift for the HCCI mode and high lift for the SI/NTLC mode.

11. The method of claim 9 wherein said direct-injection engine is further operable in an SI non-throttled load control (SI/NTLC) mode between said HCCI mode and said SI throttled mode and transitional valve actuation of intake and exhaust valves between low lift for the HCCI mode and high lift for the SI throttled mode further comprises:

controlling the variable valve actuation system during transition between the HCCI mode and the SI/NTLC mode to effect cam phasing of intake valves for advancing intake valve actuation as engine load increases.

12. The method of claim 9 wherein said direct-injection engine is further operable in an SI non-throttled load control (SI/NTLC) mode between said HCCI mode and said SI throttled mode and transitional valve actuation of intake and exhaust valves between low lift for the HCCI mode and high lift for the SI throttled mode further comprises:

controlling the variable valve actuation system during transition between the HCCI anode and the SI/NTLC mode to effect transitional valve actuation of only exhaust valves between low lift for the HCCI mode and high lift for the SI/NTLC mode, and cam phasing of intake valves to effect cam phasing of intake valves for advancing intake valve actuation as engine load increases.

13. The method of claim 9 wherein said direct-injection engine is further operable in an SI non-throttled load control (SI/NTLC) mode between said HCCI mode and said SI throttled mode and transitional valve actuation of intake and exhaust valves between low lift for the HCCI mode and high lift for the SI throttled mode further comprises:

controlling the variable valve actuation system during transition between the SI/NTLC mode and the SI throttled mode to effect transitional valve actuation of only intake valves between low lift for the SI/NTLC mode and high lift for the SI throttled mode.

* * * * *